United States Patent
Isoda et al.

(10) Patent No.: US 11,176,092 B2
(45) Date of Patent: Nov. 16, 2021

(54) DATABASE MANAGEMENT SYSTEM AND ANONYMIZATION PROCESSING METHOD

(71) Applicants: Hitachi, Ltd., Tokyo (JP); The University of Tokyo, Tokyo (JP)

(72) Inventors: Yuya Isoda, Tokyo (JP); Kazuhiko Mogi, Tokyo (JP); Kouji Kimura, Tokyo (JP); Kazuo Goda, Tokyo (JP); Yuto Hayamizu, Tokyo (JP); Masaru Kitsuregawa, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 133 days.

(21) Appl. No.: 16/575,577

(22) Filed: Sep. 19, 2019

(65) Prior Publication Data

US 2020/0167313 A1 May 28, 2020

(30) Foreign Application Priority Data

Nov. 26, 2018 (JP) .............................. JP2018-219864

(51) Int. Cl.
*G06F 16/14* (2019.01)
*G06F 16/178* (2019.01)
*G06F 21/62* (2013.01)

(52) U.S. Cl.
CPC .......... *G06F 16/144* (2019.01); *G06F 16/148* (2019.01); *G06F 16/156* (2019.01); *G06F 16/1794* (2019.01); *G06F 21/6254* (2013.01)

(58) Field of Classification Search
CPC ............... G06F 21/6254; G06F 16/148; G06F 16/1794; G06F 16/144; G06F 16/156; G06F 16/258

USPC ......................................................... 707/769
See application file for complete search history.

(56) References Cited

U.S. PATENT DOCUMENTS

| | | | | |
|---|---|---|---|---|
| 6,792,425 | B2* | 9/2004 | Yagawa | G06F 21/6227 |
| 9,558,369 | B2* | 1/2017 | Takahashi | G06F 21/6254 |
| 2006/0047696 | A1* | 3/2006 | Larson | G06F 16/2393 |
| 2007/0150279 | A1* | 6/2007 | Gandhi | G10L 13/08 |
| | | | | 704/258 |
| 2008/0082505 | A1* | 4/2008 | Kokubu | G06F 16/3332 |

(Continued)

FOREIGN PATENT DOCUMENTS

JP        2006-065846 A      3/2006

*Primary Examiner* — Shahid A Alam
(74) *Attorney, Agent, or Firm* — Mattingly & Malur, PC

(57) ABSTRACT

There is provided a database management system (DBMS) in order to make anonymization processing of the database efficient. When receiving a query including a conversion rule, the database management system is configured to process a relationship table in the database based on the conversion rule. At that time, the DBMS is configured to acquire data from a processing result table (result of processing the relationship table) stored in the past for tuples the number of which for each value appearing in a predetermined attribute satisfies a condition required for the anonymization processing. On the other hand, for tuples the number of which for each value appearing in a predetermined attribute does not satisfy the condition required for the anonymization processing, the DBMS is configured to acquire data from the database or from a result of processing the relationship table, the result being stored in rather than the processing result table.

13 Claims, 18 Drawing Sheets

(56) References Cited

U.S. PATENT DOCUMENTS

2011/0184944 A1\* 7/2011 Kenedy ................ G06F 16/955
  707/723
2015/0227589 A1\* 8/2015 Chakrabarti ...... G06F 16/24573
  707/748

\* cited by examiner

FIG. 3 patient_table
300

| pt | ZIP CODE | AGE | GENDER | ICD10 | COMMENT |
|---|---|---|---|---|---|
| 1 | 1230001 | 21 | MALE | K21 | |
| 2 | 1230001 | 24 | MALE | K21 | SLEEP DEPRIVATION |
| 3 | 1260012 | 26 | MALE | K25 | |
| 4 | 1260012 | 28 | FEMALE | K25 | |
| 5 | 1330105 | 35 | MALE | K26 | OVEREATING |
| 6 | 1330105 | 37 | MALE | K26 | |
| 7 | 1380009 | 33 | MALE | K31.0 | |
| 8 | 1380009 | 32 | FEMALE | K31.5 | |
| 9 | 1390011 | 20 | MALE | K29.2 | DRINKING ATTENTION BEFORE SLEEPING |
| 10 | 1390011 | 24 | MALE | K29.0 | | gn-rule_age
350

| AGE | AGE g5 | AGE g10 |
|---|---|---|
| 0 | 0-4 | 0-9 |
| 1 | 0-4 | 0-9 |
| 2 | 0-4 | 0-9 |
| 3 | 0-4 | 0-9 |
| 4 | 0-4 | 0-9 |
| 5 | 5-9 | 0-9 |

FIG. 5

```
Q2
SELECT    ZIP CODE, AGE g5, SUBSTR(ICD10,1,3)
FROM      patient_table, gn-rule_age
WHERE     patient_table.AGE = gn-rule_age.AGE
```

⇩

```
aQ2
WITH TMP1 /* ALL UNPROCESSED DATA SETS */ AS (      ┐
    SELECT   ZIP CODE, AGE g5, SUBSTR(ICD10,1,3)    │ 551
    FROM     patient_table, gn-rule_age             │
    WHERE    patient_table.AGE = gn-rule_age.AGE    ┘
), TMP2 /* NON-OUTPUT UNPROCESSED DATA SET */ AS (  ┐
    SELECT * FROM   TMP1                            │
    GROUP BY ZIP CODE, AGE g5, SUBSTR(ICD10,1,3)    │ 552
    HAVING   COUNT(*) < 2 // WHEN k VALUE (2)       ┘
)
SELECT * FROM TMP1 /* EXCLUDE NON-OUTPUT            ┐
UNPROCESSED DATA SET FROM ALL UNPROCESSED DATA SETS */ │ 553
WHERE NOT EXISTS ( SELECT * FROM TMP2 WHERE ...);   ┘
```

⇧ aQ2_A

| ZIP CODE | AGE g5 | ICD10 |
|---|---|---|
| 1230001 | 20-24 | K21 |
| 1230001 | 20-24 | K21 |
| 1260012 | 25-29 | K25 |
| 1260012 | 25-29 | K25 |
| 1330105 | 35-39 | K26 |
| 1330105 | 35-39 | K26 |
| 1380009 | 30-34 | K31 |
| 1380009 | 30-34 | K31 |
| 1390011 | 20-24 | K29 |
| 1390011 | 20-24 | K29 |

LOSS RATE 0%

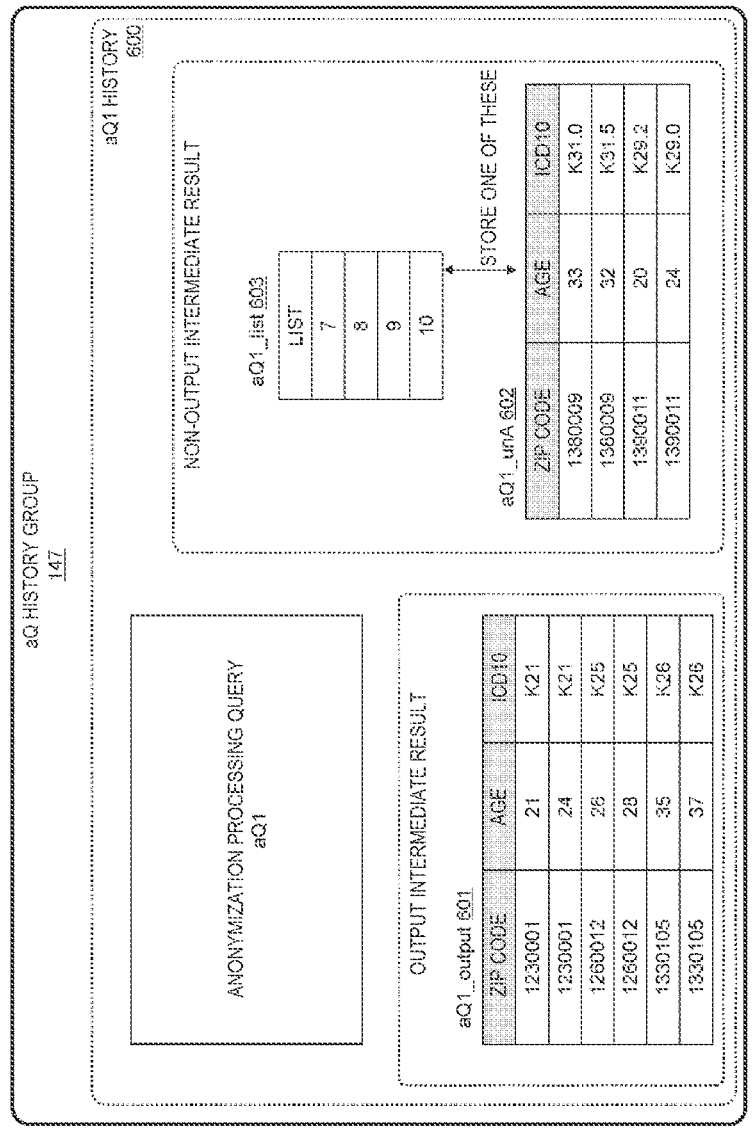

FIG. 7

```
WITH TMP1 /* ALL UNPROCESSED DATA SETS */ AS (
   SELECT    ZIP CODE, AGE g5, ICD10
   FROM      patient_table, gn-rule_age
   WHERE     patient_table. AGE = gn-rule_age. AGE
), TMP2 /* NON-OUTPUT UNPROCESSED DATA SET */ AS (
   SELECT    * FROM    TMP1
   GROUP BY ZIP CODE, AGE g5, ICD10
   HAVING    COUNT(*) < 2 // WHEN k VALUE (2)
)
SELECT * FROM TMP1 /* EXCLUDE NON-OUTPUT UNPROCESSED
DATA SET FROM ALL UNPROCESSED DATA SETS */
WHERE NOT EXISTS ( SELECT * FROM TMP2 WHERE ...) ;
```
701

```
WITH TMP1 /* ALL UNPROCESSED DATA SETS */ AS (
   SELECT    ZIP CODE, AGE g5, ICD10
   FROM      patient_table, gn-rule_age
   WHERE     patient_table. AGE = gn-rule_age. AGE
), TMP2 /* NON-OUTPUT UNPROCESSED DATA SET */ AS (
   SELECT    * FROM    TMP1
   GROUP BY ZIP CODE, AGE g5, ICD10
   HAVING    COUNT(*) < 2 // WHEN k VALUE (2)
)
SELECT * FROM TMP1 /* EXCLUDE NON-OUTPUT UNPROCESSED
DATA SET FROM ALL UNPROCESSED DATA SETS */
WHERE EXISTS ( SELECT * FROM TMP2 WHERE ...) ;
```
702

FIG. 8

```
WITH TMP1 /* ALL UNPROCESSED DATA SETS */ AS (
  SELECT    ZIP CODE, AGE g5, ICD10
  FROM      patient_table, gn-rule_age
  WHERE     patient_table. AGE = gn-rule_age. AGE
), TMP2 /* NON-OUTPUT UNPROCESSED DATA SET */ AS (
  SELECT    * FROM    TMP1
  GROUP BY ZIP CODE, AGE g5, ICD10
  HAVING    COUNT(*) < 2 // WHEN k VALUE (2)
) AS CREATE HISTORY aQ1.unA  /* CLEAR INDICAITON OF
  STORAGE DESTINATION */
SELECT * FROM TMP1 /* EXCLUDE NON-OUTPUT UNPROCESSED
DATA SET FROM ALL UNPROCESSED DATA SETS */
WHERE NOT EXISTS ( SELECT * FROM TMP2 WHERE ...) ;
```

FIG. 9

Q2
```
SELECT    ZIP CODE, AGE g5, SUBSTR(ICD10,1,3)
FROM      patient_table, gn-rule_age
WHERE     patient_table.AGE = gn-rule_age.AGE ;
```

HISTORY NON-USE aQ2
```
WITH TMP1 /* ALL UNPROCESSED DATA SETS */ AS (
  SELECT    ZIP CODE, AGE g5, SUBSTR(ICD10,1,3)
  FROM      patient_table, gn-rule_age
  WHERE     patient_table.AGE = gn-rule_age.AGE
), TMP2 /* NON-OUTPUT UNPROCESSED DATA SET */ AS (
  SELECT    * FROM    TMP1
  GROUP BY ZIP CODE, AGE g5, SUBSTR(ICD10,1,3)
  HAVING    COUNT(*) < 2 // WHEN k VALUE (2)
)
SELECT * FROM TMP1 /* EXCLUDE NON-OUTPUT
UNPROCESSED DATA SET FROM ALL UNPROCESSED DATA SETS */
WHERE NOT EXISTS ( SELECT * FROM TMP2 WHERE ...) ;
```

HISTORY USE aQ2
```
WITH TMP1 /* ALL UNPROCESSED DATA SETS */ AS (
  SELECT    ZIP CODE, AGE g5, SUBSTR(ICD10,1,3)
  FROM      aQ1.output
  UNION ALL
  SELECT    ZIP CODE, AGE g5, SUBSTR(ICD10,1,3)
  FROM      aQ11.unA /* OR, aQ11.list */
), TMP2 /* NON-OUTPUT UNPROCESSED DATA SET */ AS (
  SELECT    * FROM    TMP1
  GROUP BY ZIP CODE, AGE g5, SUBSTR(ICD10,1,3)
  HAVING    COUNT(*) < 2 // WHEN k VALUE (2)
)
SELECT * FROM TMP1 /* EXCLUDE NON-OUTPUT
UNPROCESSED DATA SET FROM ALL UNPROCESSED DATA SETS */
WHERE NOT EXISTS ( SELECT * FROM TMP2 WHERE ...) ;
```

FIG. 10
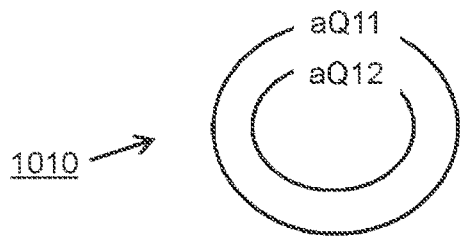
1010 →
1020 →
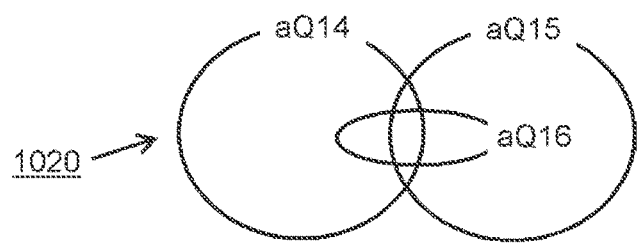
FIG. 11
HISTORY SETTING INFORMATION
1100
| | | |
|---|---|---|
| 1101 | USE FLAG | y |
| 1102 | EXECUTION FLAG | y |
| 1103 | list STORAGE UPPER LIMIT | 0.1 [%] |
| 1104 | unA STORAGE UPPER LIMIT | 100 [MB] |
| 1105 | NUMBER OF QUERY UPPER LIMIT | 100 |
| 1106 | OVERALLL QUERY CAPACITY UPPER LIMIT | 4096 [MB] |
| 1107 | SHARE FLAG | y |

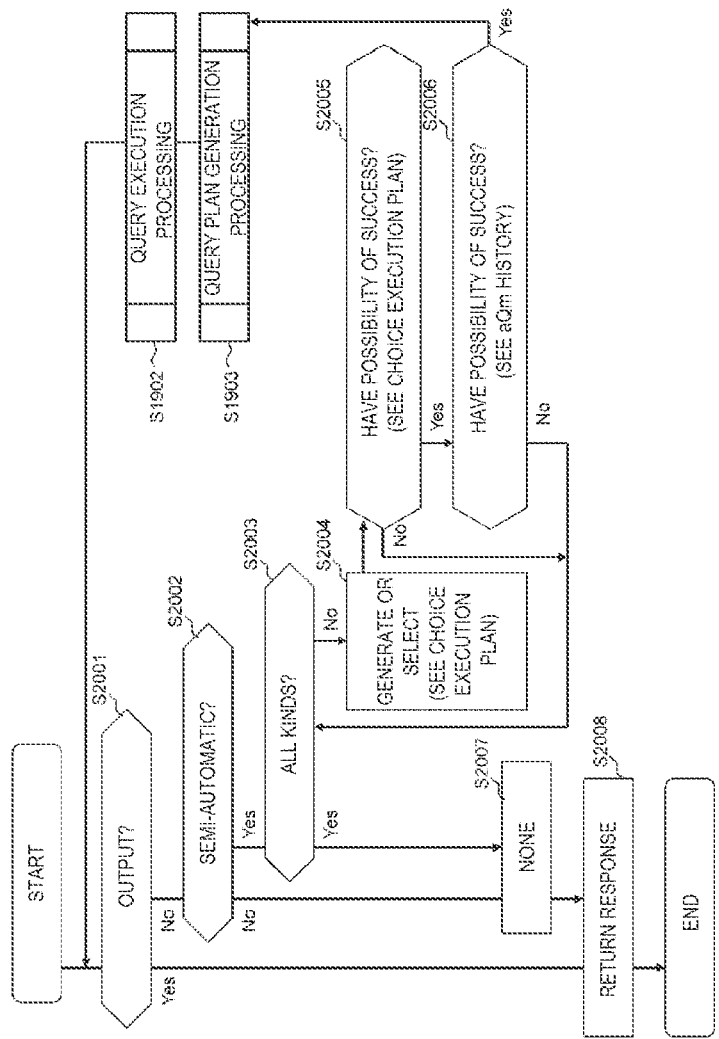

DATABASE MANAGEMENT SYSTEM AND ANONYMIZATION PROCESSING METHOD

CROSS-REFERENCE TO RELATED APPLICATION

The present application claims priority from Japanese application JP 2018-219864, filed on Nov. 26, 2018, the contents of which is hereby incorporated by reference into this application.

BACKGROUND OF THE INVENTION

1. Field of the Invention

The present invention relates generally to data processing and, for example, to database management.

2. Description of the Related Art

In general, in anonymization processing of the database, when a result of processing in a certain query does not satisfy an anonymization processing condition (for example, a k value), reprocessing such as generalizing a certain attribute value of data is performed. It takes a long time in anonymization processing to acquire data from a database each time the data is reprocessed.

JP-A-2006-65846 (Patent Literature 1) discloses a technology of creating a partially materialized view of the database in advance and using the partially materialized view for a portion where the partially materialized view can be used in query processing.

It is conceivable to make the anonymization processing efficient by applying the technology disclosed in Patent Literature 1 to the anonymization processing of the database.

However, Patent Literature 1 does not clearly disclose what kind of materialized view is to be created.

Therefore, it is difficult to effectively use the partially materialized view disclosed in Patent Literature 1 in the anonymization processing of the database.

SUMMARY OF THE INVENTION

According to an aspect as an example, a database management system (DBMS) that manages a database storing a relationship table including a plurality of tuples each including values for attributes, includes a query receiving unit configured to receive a first query including a first conversion rule, and a query processing unit configured to process the relationship table based on the first conversion rule, store a first processing result table which is a processing result, and calculate the number of tuples for each value appearing in a predetermined attribute in the first processing result table. When the query receiving unit receives a second query including a second conversion rule, the query processing unit is configured to process the relationship table based on the second conversion rule. At that time, the query processing unit is configured to acquire data from the first processing result table that is processed based on the first conversion rule for tuples the number of which for each value appearing in the predetermined attribute satisfies a condition required for the anonymization processing. For tuples the number of which for each value appearing in the predetermined attribute does not satisfy the condition required for the anonymization processing, the query processing unit is configured to acquire data from the database or a result of processing the relationship table, the result being stored in other than the first processing result table, and process the relationship table based on the second conversion rule using the data.

According to an aspect as another example, a DBMS that manages a database that stores a relationship table including a plurality of tuples each including values for attributes includes a query receiving unit configured to receive a query including a conversion rule, and a query processing unit configured to process the relationship table based on a third conversion rule generated based on the conversion rule included in the received query, store a third processing result table which is a processing result, and calculate the number of tuples for each value appearing in a predetermined attribute in the third processing result table. When the result of the calculation does not satisfy a predetermined condition, the query processing unit is configured to generate a fourth conversion rule. The query processing unit is configured to process the relationship table based on the fourth conversion rule. At that time, the query processing unit is configured to acquire data from the third processing result table that is processed based on the third conversion rule for tuples the number of which for each value appearing in the predetermined attribute satisfies the condition required for the anonymization processing. For tuples the number of which for each value appearing in the predetermined attribute does not satisfy the condition required for the anonymization processing, the query processing unit is configured to acquire data from the database or a result of processing the relationship table, the result being stored in other than the third processing result table, and process the relationship table based on the fourth conversion rule using the data.

The reprocessing is performed at a high speed since it is not necessary to acquire all tuples necessary for reprocessing from the database by acquiring tuples that satisfy the conditions required for the anonymization processing from the already materialized processing results.

BRIEF DESCRIPTION OF THE DRAWINGS

FIG. 3 is a diagram showing an example of a relationship table and an example of an anonymization processing rule table;

FIG. 5 is a diagram showing an example of a query Q2, an anonymization processing query aQ2, and a query response aQ2_A;

FIG. 6 is a diagram showing a configuration of an aQ history group;

FIG. 7 is a diagram showing an example of a concept of an output intermediate result and a non-output intermediate result;

FIG. 8 is a diagram showing an example of an anonymization processing query aQ1 clearly indicating storage of a non-output intermediate result table;

FIG. 9 is a diagram showing a history non-use aQ2 and a history use aQ2;

FIG. 10 is a schematic diagram showing an example of a condition in which the aQ history group can be used;

FIG. 11 is a diagram showing an example of history setting information;

FIG. 20 is a flowchart showing a flow of query response processing.

DESCRIPTION OF THE PREFERRED EMBODIMENTS

Figure 1:
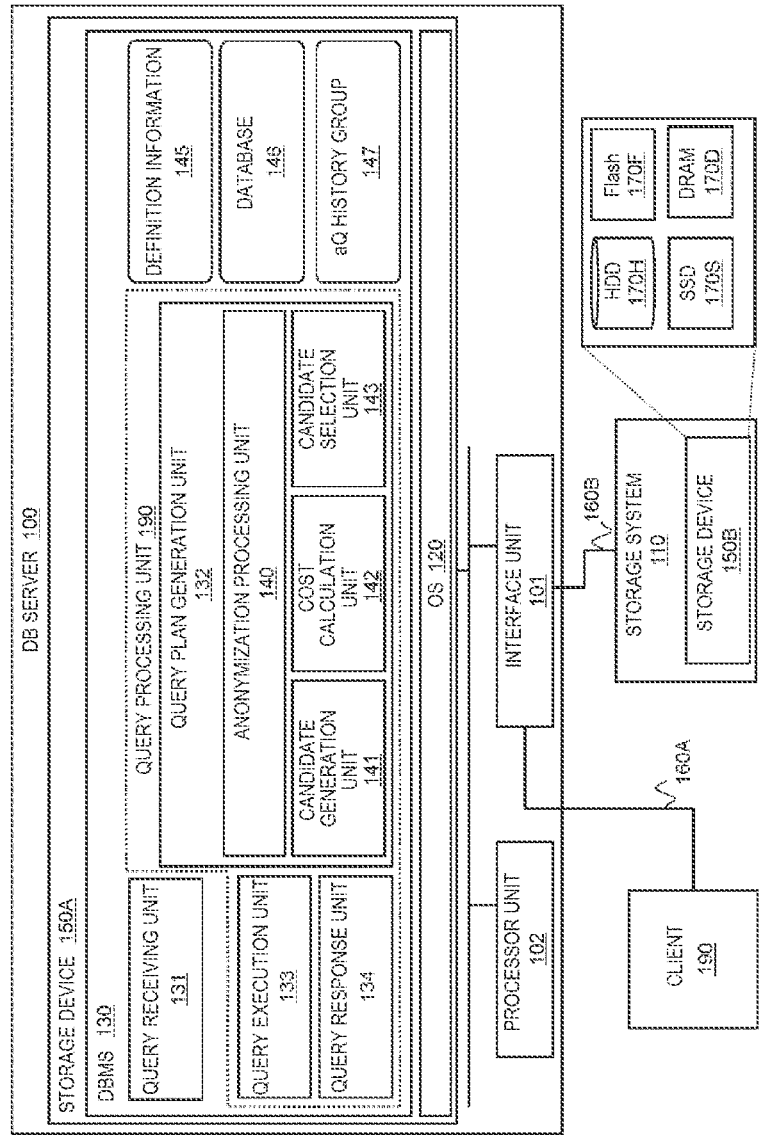
FIG. 1 is a diagram showing a configuration example of an entire system including a DB server that executes a DBMS according to a first embodiment.

In the following description, a database management system is referred to as "DBMS", and a server having the DBMS is referred to as a "DB server". An issuer of the query to the DBMS may be a computer program external to the DBMS (for example, an application program). The external computer program may be a program executed in the DB server, or may be a program executed by a device connected to the DB server (for example, a client).

In the following description, an "interface unit" includes one or more interfaces. The one or more interfaces may be one or more interface devices of same type (for example, one or more Network Interface Cards (NICs)) and may be two or more interface devices of different types (for example, NIC and Host Bus Adapter (HBA)).

In the following description, a "storage device unit" includes one or more storage devices. The storage device may be a volatile memory (for example, a main storage memory), a nonvolatile memory (for example, a flash memory or a Solid State Drive (SSD) including the same), or may be a disk device (for example, a Hard Disk Drive (HDD)). In the storage device unit, all the storage devices may be the same type, or storage devices of different types may be mixed.

In the following description, a "processor unit" includes one or more processors. At least one processor is typically a Central Processing Unit (CPU). The processor may include a hardware circuit that performs a part or all of the processing.

Further, in the following description, although a function may be described in an expression of "kkk unit", the function may be realized by the processor unit executing one or more computer programs, or may be realized by one or more hardware circuits (for example, a Field-Programmable Gate Array (FPGA) or an Application Specific Integrated Circuit (ASIC)). When the function is realized by the processor unit executing the program, the function may be at least a part of the processor unit, since defined processing is performed using the storage device unit and/or the interface unit as appropriate. The processing described with the function as a subject may be processing performed by a processor unit or a device including the processor unit. The program may be installed from a program source. The program source may be, for example, a recording medium (for example, a non-transitory recording medium) readable by a program distribution computer or a computer. The description of each function is exemplary, and a plurality of functions may be combined into a single function, or one function may be divided into a plurality of functions.

In the following description, a common part in reference numerals may be used when elements of the same type are described without distinction, and a reference numeral may be used when the elements of the same type are described with distinction. For example, when the storage device is not distinguished, the storage device is referred to as "storage device 150" and when the storage device is distinguished, the storage device is referred to as "storage device 150A" and "storage device 150B".

Hereinafter, some embodiments of the invention will be described with reference to the drawings. The invention is not limited by the following description.

First Embodiment

FIG. 1 is a diagram showing a configuration example of an entire system including a DB server that executes a DBMS according to a first embodiment.

The DB server 100 is an example of a computer system. The DB server 100 may be, for example, a personal computer, a workstation, or a mainframe, may be a virtual computer constituted by a virtualization program in the above computers, and may be realized on a cloud environment (for example, a calculation resource pool that includes a plurality of calculation resources, such as interface devices, storage devices, and processors).

A client 190 and a storage system 110 are connected to the DB server 100.

Specifically, for example, the client 190 is connected to the DB server 100 via a network 160A. The client 190 is an example of a query issuer and issues a query for the database to the DB server 100.

In addition, for example, the storage system 110 is connected to the DB server 100 via a network 160B. The storage system 110 includes a storage device 150B. When the storage system 110 receives an I/O request from the DB server 100, the storage system 110 performs I/O of data with respect to the storage device 150 in respond to the I/O request.

The Networks 160A and 160B may be networks with different communication speeds and power consumption, or the networks 160A and 160B may be the same network. For example, each of the networks 160A and 160B may be any of a Fibre Channel (FC) network, an Ethernet (registered trademark), an InfiniBand, and a Local Area Network (LAN).

The DB server 100 includes an interface unit 101, a storage device 150A, and a processor unit 102 connected thereto. The DB server 100 may include an input device (not shown) such as a keyboard and a pointing device, and an output device (not shown) such as a liquid crystal display. The input device and the output device may be connected to the processor unit 102. The input device and the output device may be integrated.

The interface unit 101 is connected to the networks 160A and 160B. Via the interface unit 101 (via the networks 160A and 160B), the DB server 100 can communicate with the storage system 110 and the client 190.

Each of the storage devices 150A and 150B includes one or more storage devices 170. The configurations of the storage devices 150A and 150B may be the same or different. The storage device 150 may be constituted by two or more storage devices 170 of the same type (for example, I/O performances are equivalent), or the storage device 150 may be constituted by two or more storage devices 170 of different types (for example, I/O performances are different). An example of the latter storage device 150 is the storage device 150B. The storage device 150B includes a plurality of types of storage devices 170 such as an HDD 170H, a Solid State Drive (SSD) 170S, a flash memory 170F, and a Dynamic Random Access Memory (DRAM) 170D. The HDD 170H and the SSD 170S are examples of an auxiliary storage drive. The flash memory 170F is an example of a Non-Volatile Memory (NVM). The DRAM 170D is an example of a main storage memory. A database is stored in at least one of the storage devices 150A and 150B.

The storage device 150A stores a program to be executed by the processor unit 102 and data to be used by the program. The program includes, for example, a DBMS 130 and an Operating System (OS) 120. The DBMS 130 receives a query from the client 190 and executes the query. In executing of the query, the DBMS 130 issues an Input/Output (I/O) request to the OS 120 to read data from the database or to write data to the database. The OS 120 receives the I/O request, issues an I/O request based on the I/O request to the storage device 150, and returns a result to the DBMS 130.

The DBMS 130 includes a query receiving unit 131 and a query processing unit 190, and manages information such as definition information 145, a database 146, and an aQ history group 147. The query processing unit 190 includes a query plan generation unit 132, a query execution unit 133, and a query response unit 134. The configuration of the DBMS 130 is merely an example. For example, certain component may be divided into a plurality of components, and a plurality of components may be integrated into a single component. For example, an anonymization processing unit 140, a cost calculation unit 142, and a candidate selection unit 143, which will be described later, may exist outside the query plan generation unit 132. More specifically, for example, the anonymization processing unit 140 may be implemented in the client 190 or may be implemented in a computer system other than the DB server 100.

The query receiving unit 131 receives a query for the database from the client 190. The query is described, for example, by Structured Query Language (SQL).

The query plan generation unit 132 generates a query plan necessary for executing the query based on the received query. The query plan is, for example, information including a relationship between one or more database operators and an execution order of the database operators. The query plan may be represented by, for example, a tree structure in which a database operator is set as a node and a relationship of the execution order of the database operators is set as an edge.

In the present embodiment, "generate a query plan" is to generate one or more query plan candidates and select one query plan candidate to be executed from the one or more query plan candidates. The query plan generation unit 132 includes the anonymization processing unit 140, the candidate generation unit 141, the cost calculation unit 142, and the candidate selection unit 143. The anonymization processing unit 140 generates an anonymization processing query aQ, which will be described later, based on a query Q including a conversion rule. The candidate generation unit 141 generates one or more query plan candidates based on the anonymization processing query aQ. The cost calculation unit 142 calculates a query cost for each of the one or more query plan candidates. For each query plan candidate, the query cost is a cost when executing a query based on the query plan candidate, and is a cost based on an amount of power consumption related to query execution based on the query plan candidate. The higher the query cost is, the larger the amount of the power consumption (and/or the longer the execution time of the query) tends to be. The candidate selection unit 143 selects a query plan candidate having a relatively low query cost from the one or more query plan candidates. The "query plan candidate having a relatively low query cost" may be, for example, any one of the query plan candidates belonging to a top X % (for example, a predetermined numerical value larger than 0) among the ascending order query costs. In the present embodiment, the "query plan candidate having a relatively low query cost" is typically a query plan candidate having the lowest query cost (for example, if the query costs of all the query plan candidates are within respective upper limits of the execution time, the maximum power, and the amount of power consumption to be described later).

The query execution unit 133 executes the anonymization processing query aQ based on the generated query plan (the selected query plan candidate). The query execution unit 133 may appropriately change a state of a part of the storage devices 170 to a power saving state or cancel the power saving state of another part of the storage devices 170 based on the query plan. To change the state of the storage device 170, the query execution unit 133 may be able to transmit an instruction (for example, a state transition instruction specifying a logical device on which the storage device 170 is based) to the storage device 170. In response to the instruction, the state of the storage device 170 may be changed by the storage device 170 (or the storage system 110). In the execution of the anonymization processing query aQ, the query execution unit 133 generates a task for executing the database operator, and executes the generated task, thereby issuing a data read request necessary for the database operator corresponding to the task. The query execution unit 133 may execute a plurality of database operators in one task. As the implementation of the task, for example, a user thread to be realized by a library or the like may be used in addition to a process to be realized by the OS 120, a kernel thread, and the like.

The query response unit 134 responds to the client 190 with an execution result of the anonymization processing query aQ as an execution result of the query Q.

The definition information 145 includes information defined by one or both of an administrator and a user of the DBMS 130. At least a part of the definition information 145 may be described in the query received by the query receiving unit 131. The definition information 145 includes, for example, setting information related to update of the aQ history group 147. The definition information 145 may further include, for example, information showing a coefficient and an upper limit of a parameter (for example, execution time, maximum power, and an amount of power consumption) to be used to calculate the query cost.

The database 146 includes a relationship table. The relationship table may be one table or a plurality of tables. The relationship table includes a plurality of tuples. Each of the plurality of tuples is a plurality of attribute values corresponding to a plurality of (or one) attribute items, and is, for example, one data object such as one record. At least a part of the database 146 may be stored in the storage device 150B.

The aQ history group 147 is an aQ history for each anonymization processing query aQ. For each anonymization processing query aQ, the aQ history corresponds to an intermediate result of the execution of the anonymization processing query aQ, and specifically includes a data set obtained in the execution of the anonymization processing query aQ.

The entire system according to the present embodiment is described above.

In the present embodiment, during reprocessing in the anonymization processing of the relationship table, it is possible to avoid reacquiring all tuples corresponding to the query from the database every time the reprocessing is performed by using already materialized processing results, and as a result, the reprocessing is performed at a high speed. The efficiency of the anonymization processing of the relationship table will be described in detail below. In the following description, the following terms will be used.

Query Qx (or simply "Qx"): a query that includes conversion rules for the anonymization processing (x is a natural number).

Anonymization processing query aQx (or simply "aQx"): a query for anonymization processing of a data set according to the query Qx. The aQx includes details of the anonymization processing. Details of the anonymization processing include anonymization processing conditions (conditions required for anonymization processing) in addition to the conversion rules included in the query Qx. The anonymization processing condition may be a k value (k value lower limit) if the anonymization processing is k-anonymization, and may be an l value (l value lower limit) if the anonymization processing is l-diversification.

Query plan aQx_P (or simply "aQx_P"): a query plan for the anonymization processing query aQx.

Query response aQx_A (or simply "aQx_A"): a response to a result of executing the aQx based on the aQx_P (answer to the aQx).

Data set: All or a part of the tuple. That is, the data set is constituted by one or more attribute values. Hereinafter, a data set to which the anonymization processing is performed may be referred to as a "processed data set", and a data set to which the anonymization processing is not performed may be referred to as an "unprocessed data set". At least one attribute value included in the processed data set is a processed attribute value. Any attribute value included in the unprocessed data set is an unprocessed attribute value.

Search range: an example of a read range, for example, one or more attribute items.

Anonymization processing range: a search range including at least one attribute item associated with the conversion rules.

Conversion rule: one or more anonymization processing rules.

Anonymization processing rule: rules for anonymization processing of attribute values.

Figure 2:
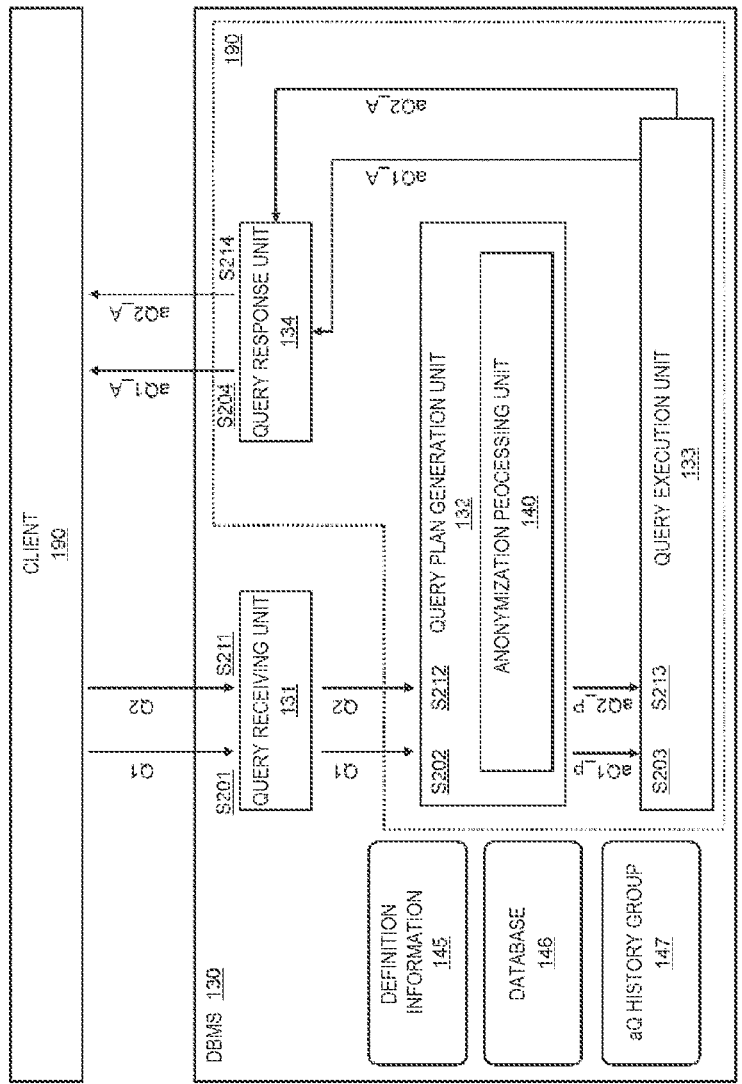
FIG. 2 is a schematic diagram of a flow of anonymization processing according to the first embodiment.

FIG. 2 is a schematic diagram of a flow of the anonymization processing according to the present embodiment.

The query receiving unit 131 receives, from the client 190, a query Q1 (an example of a first query) including a first conversion rule (S201).

In the query plan generation unit 132, an anonymization processing query aQ1 based on the query Q1 is generated by the anonymization processing unit 140, and a query plan aQ1_P based on the anonymization processing query aQ1 is generated (S202).

The query execution unit 133 executes the aQ1 according to the aQ1_P (S203).

The query response unit 134 returns a query response aQ1_A according to the result of the execution of the aQ1 to the client 190 that is a transmission source of the query Q1 (S204).

Next, the query receiving unit 131 receives a query Q2 (an example of a second query) including a second conversion rule from the client 190 (S211). As an example of a case where the query Q2 is issued from the client 190, a case where the query response aQ1_A to the previous query Q1 does not satisfy the user may be considered. Examples of such a case may include a case where a loss rate described later in execution of the aQ1 does not fall within a predetermined loss rate range, or a case where the user is not satisfied with the number of processed data sets satisfying the anonymization processing condition. In such a case, the query Q2 is typically a query determined based on the previous query Q1 and the response aQ1_A thereof (for example, a query in which a subset of the anonymization processing range specified by the query Q1 is set as an anonymization processing range).

Then, processing S212 to S214 similar to S202 to S204 is performed. That is, in the query plan generation unit 132, an anonymization processing query aQ2 based on the query Q2 is generated by the anonymization processing unit 140, and a query plan aQ2_P based on the aQ2 is generated (S212). The query execution unit 133 executes the aQ2 according to the aQ2_P (S213). The query response unit 134 returns a query response aQ2_A according to the result of the execution of the aQ2 to the client 190 (S214).

An i-th query i (i is an integer equal to or greater than 2), such as the query Q2, is typically a query related to a previous query, and specifically a query based on at least one previous query and the response thereof. Therefore, there is a high possibility that the query response aQi_A is a response satisfied by the user. If the user is not satisfied with the query response aQi_A, a (i+1)-th query Q (i+1) determined based on at least one previous query (for example, the Qi and/or one or more queries earlier) and a response thereof is issued from the client 190, and thus S211 to S214 may be further performed for the query Q(i+1).

Hereinafter, elements and matters related to the flow described with reference to FIG. 2 will be described in detail.

FIG. 3 is a diagram showing an example of a relationship table and an example of an anonymization processing rule table.

An example of the relationship table is a patient_table 300. The patient_table 300 includes a plurality of tuples. Each tuple is a plurality of attribute values respectively corresponding to a plurality of attribute items. Examples of an attribute item and attribute value pair include, taking the second tuple as an example, "pt: 2", "ZIP code: 1230001", "age: 24", "gender: male", "ICD10: K21", and "comment: sleep deprivation" in an expression of "attribute item: attribute value". The "pt" corresponds to an identification number of the tuple. At least a part of the plurality of attribute items (for example, ZIP code, age and gender) are attribute items belonging to quasi-identifiers. The plurality of attribute items further include attribute items (for example, ICD10) belonging to sensitive information. Hereinafter, in order to avoid confusion, an attribute value of an attribute item "Y" is expressed as a "Y value". For example, the attribute value of the attribute item "age" is expressed as an "age value".

An example of the anonymization processing rule table is a gn-rule_age350, which is an example of an anonymization processing rule table of age values. The gn-rule_age 350 shows a correspondence relationship of an age value, an anonymization processing rule of an age value, and a processed age value (an age value that has been anonymously processed according to the anonymization processing rule). The anonymization processing rule "age gσ" (in the illustrated example, σ=5 or 10) is a method of anonymizing the age value in units of σ years. Therefore, an age value "3" is processed to an age value "0-4" according to the anonymization processing method "age g5", and the age value "3" is processed to an age value "0-9" according to the anonymization processing rule "age g10".

The anonymization processing rule is information in a tabular form in the present embodiment, and is stored as at least a part of the definition information 145, the database 146, or other information, and the anonymization processing unit 140 can know the anonymization processing rule from the information. Instead of or in addition to the above method, the anonymization processing unit 140 may recognize the anonymization processing rule in other methods, such as the anonymization processing rule being described in the query Qx (as a result, the anonymization processing rule is described in the anonymization processing query aQx).

Hereinafter, in order to simplify the description, it is assumed that only the patient_table 300 is a relationship table as the database 146.

Figure 4:
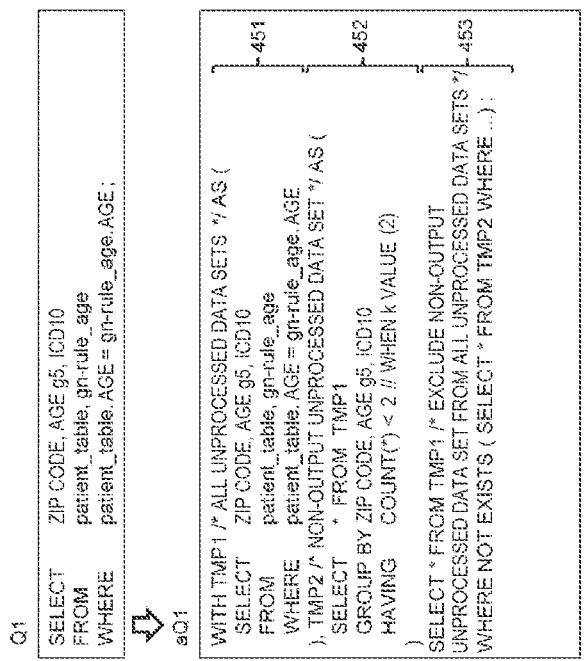
FIG. 4 is a diagram showing an example of a query Q1, an anonymization processing query aQ1, and a query response aQ1_A.

FIG. 4 is a diagram showing an example of a query Q1, an anonymization processing query aQ1, and a query response aQ1_A.

An anonymization processing range "ZIP code, age g5, and ICD10" specified by the query Q1 means the following.
  The one or more attribute items as a search range are "ZIP code", "age", and "ICD10".
  The ZIP code value and the ICD10 value do not need anonymization processing.
  The age value needs to be processed in unit of 5 years. That is, the "age g5" corresponds to the attribute item to which the conversion rule is associated.

In the present embodiment, "query includes the conversion rule" may mean that information indicating the conversion rule itself (for example, "age g5" and gn-rule_age 350 itself) is included, or information necessary for specifying the conversion rule (for example, a name of an anonymization rule table to be referred to as "age g5").

The query Q1 is converted into an anonymization processing query aQ1 by the anonymization processing unit 140 based on the definition information 145. The definition information 145 includes information showing a definition of the conversion from Qx to aQx. The definition information 145 may include information indicating which of a plurality of types of anonymization processing such as k-anonymization and l-diversification is to be adopted, and which anonymization processing condition such as k value and l value is to be used.

The anonymization processing query aQ1 includes information 451 to 453. In the description of the information 451 to 453, the processed age value means the age value processed according to the conversion rule included in the query Q1, and the k value ≥2 (k value lower limit=2) means the anonymization processing condition.

The information 451 means the following.
  A data set is to be acquired and a first temporary table (TMP 1) is to be stored.
  An acquisition source (read source) of the data set is patient_table 300.
  The first temporary table is constituted by all unprocessed data sets acquired from all tuples of the patient_table 300 according to the query Q1. Each processed data set is constituted by a ZIP code value, a processed age value, and an ICD10 value.

The information 452 means the following.
  A second temporary table (TMP 2) is to be stored.
  The second temporary table is constituted by an unprocessed data set corresponding to the processed data set with k<2 in the first temporary table. The "processed data set with k<2" is a processed data set having a k value of less than 2, specifically, is a processed data set belonging to a processed data set group in which the number of processed data sets with the same combination of the ZIP code value, the processed age value, and the ICD10 value is less than 2. The processed data set with k<2 is an example of a processed data set that does not satisfy the anonymization processing condition, in other words, an example of a non-output processed data set (a processed data set that cannot be output as a query response). The original data set of the non-output processed data set is a non-output unprocessed data set.

The information 453 means the following.
  All the non-output unprocessed data sets stored in the second temporary table is excluded from the first temporary table. As a result, only the unprocessed data set corresponding to the processed data set with k≥2 remains in the first temporary table. The processed data set with k≥2 is a processed data set having a k value of 2 or more. The processed data set with k≥2 is an example of a processed data set satisfying the anonymization processing condition, in other words, is an example of the output processed data set (processed data set that can be output as a response to the query). The original data set of the output processed data set is an output unprocessed data set.

The query response aQ1_A is generated by executing the above-described anonymization processing query aQ1. The query response aQ1_A may be a response corresponding to at least one of the following.
  Include a processed data set with k≥2.
  Do not include a processed data set with k<2.
  Include a loss rate.
  The "loss rate" is a ratio of the number of the processed data sets with k<2 to the total number of processed data sets. The loss rate is calculated by the query execution unit 133.
  When the loss rate does not fall within a predetermined loss rate range, do not include any processed data set with k≥2, and indicates that there is no applicable data set with k≥2.

When the user is not satisfied with such a query response aQ1_A, the client 190 can issue a query Q2 as illustrated in FIG. 5.

FIG. 5 is a diagram showing an example of a query Q2, an anonymization processing query aQ2, and a query response aQ2_A. Differences from FIG. 4 will be mainly described with reference to FIG. 5.

An anonymization processing range specified by the query Q2 is a subset of the anonymization processing range specified by the query Q1. For example, the combination of the attribute items "ZIP code", "age", and "ICD10" are the same, and an abstraction level (anonymization degree) of the conversion rule is only increased. Specifically, the "ZIP code" and the "age g5" are the same, and "ICD10" is only changed to "SUBSTR (ICD10, 1, 3)". The "SUBSTR (ICD10, 1, 3)" means "anonymously processing from the first character to the third character of the ICD10 value".

Thus, query Q2 means obtaining the ZIP code values, the age values, and the ICD10 values from all tuples of patient_table 300 and anonymously processing the age values and ICD10.

By converting the query Q2 based on the definition information 145, the anonymization processing query aQ2 including the conversion rule included in the query Q2, specifically, the anonymization processing query aQ2 in which information 551 to 553 is described is generated. In the description of the information 551 to 553, the processed age value and the processed ICD10 value mean an age value and an ICD10 value processed according to the conversion rule included in the query Q2.

The information 551 is different from the information 451 in FIG. 4 in the following points.

The acquisition source (read source) of the data set is not the patient_table 300, and is an aQ1_output and an aQ1_unA (or aQ1_list) to be described later. The aQ1_output corresponds to the first temporary table stored in the execution of the previous query Q1. The aQ1_unA corresponds to the second temporary table stored in the execution of the previous query Q1. That is, according to the information 551, the acquisition source of the data set of the subsequent query Q2 is not the patient_table 300 but temporary tables. As a result, the anonymization processing according to the subsequent query Q2 is at a high speed.

The information 552 and 553 are the same as the information 452 and 453 in FIG. 4 respectively.

The query response aQ2_A is generated by executing the anonymization processing query aQ2. As a result of anonymously processing the ICD10 value in addition to the age value, there is no processed data set having a k value of less than 2, and thus the loss ratio is 0%. That is, there are more processed data sets with k≥2 than that of the query response aQ1_A, and the loss ratio falls within a predetermined loss rate range.

FIG. 6 is a diagram showing a configuration of the aQ history group 147.

The aQ history group 147 includes, for each anonymization processing query, a history 600 as information including an intermediate result during execution of the anonymization processing query. Hereinafter, the history 600 corresponding to one anonymization processing query aQx is referred to as an "aQx history 600". An aQ1 history 600 will be described as an example of the aQx history 600.

The aQ1 history 600 includes the aQ1 (and/or Q1), an aQ1_output 601, and one of an aQ1_unA 602 and an aQ1_list 603.

The aQ1_output 601 is an example of an output intermediate result that is an intermediate result associated with a processed data set satisfying the anonymization processing condition. The "intermediate result" means any one of an unprocessed state and a processed state. Accordingly, the intermediate result may include any of the unprocessed data set and the processed data set. In the present embodiment, although the intermediate result includes the unprocessed data set, instead or in addition, the intermediate result may include the processed data set. For the data set stored as the intermediate result, the unprocessed data set as the intermediate result can be more likely to be used in subsequent queries than the processed data set. The reason is that the unprocessed attribute value has the lowest abstraction level, and therefore, it is possible to perform anonymization processing regardless of the abstraction level of the conversion rule. According to FIG. 6, the aQ1_output 601 is a set of the unprocessed data sets (original data sets) corresponding to the processed data sets satisfying the anonymization processing condition (k≥2). The aQ1_output 601 is an example of a first processing result table.

The aQ1_unA 602 and the aQ1_list 603 are examples of non-output intermediate results that are intermediate results associated with the processed data set that does not satisfy the anonymization processing condition. The aQ1_unA 602 is a set of the unprocessed data sets corresponding to the processed data sets that do not satisfy the anonymization processing condition. Meanwhile, the aQ1_list 603 is a list of pointers to the tuples including the unprocessed data sets that do not satisfy the anonymization processing condition (pointers to pt in the patient_table 300). If aQ1_unA 602 exists, acquisition (reading) from the patient_table 300 is not necessary even for a data set that is not in the aQ1_output 601. The aQ1_unA 602 is an example of the second processing result table, and the aQ1_list 603 is an example of the stored information.

The processed data set is acquired at a higher speed from the aQx history 600 than from the patient_table 300 (in the present embodiment, the unprocessed data set is acquired and the unprocessed data set is processed). A history area, which is a storage area in which the aQx history 600 is stored (for example, cached), may be an area having a higher I/O performance than that of a database area which is a storage area in which the patient_table 300 is stored. Specifically, for example, the database area is a storage area based on a nonvolatile storage device in (or away from) the DB server 100, and the history area may be a storage area based on a volatile memory (for example, cache memory) of the DB server 100.

FIG. 7 is a diagram showing an example of a concept of the output intermediate result and the non-output intermediate result.

Specifically, the reference numeral 701 shows a concept of the output intermediate result, and the reference numeral 702 shows a concept of the non-output intermediate result. As can be seen by comparing the both, the output intermediate result includes a data set that satisfies the anonymization processing condition and does not include a data set that does not satisfy the anonymziation processing condition (see, for example, "NOT" in the last line). Conversely, the non-output intermediate result includes a data set that does not satisfy the anonymization processing condition (or a pointer to the tuple including the data set) and does not include a data set that satisfies the anonymization processing condition (for example, unlike the reference numeral 701, there is no "NOT" in the last line).

In the present embodiment, although the DBMS 130 has a function of storing both the output intermediate result and the non-output intermediate result as at least a part of the aQx history 600, but ON (or OFF) can be specified in unit of a query for the function of storing at least the non-output intermediate result. In other words, the user can expressly specify a query that stores (or does not store) the non-output intermediate result to the DBMS 130.

FIG. 8 is a diagram showing an example of an anonymization processing query aQ1 clearly indicating the storage of the non-output intermediate result.

According to FIG. 8, the anonymization processing query aQ1 has an example description "AS CREATE HISTORY aQ1. unAns" as the clear indication of storing the non-output intermediate result for the aQ1. Such a description may be reflected from the original query Q1.

The query execution unit 133 may store the non-output intermediate result only when such an anonymization processing query is executed. In this way, since it is possible to select storage and non-storage of the non-output intermediate result, it is possible to suppress enlargement of the aQ history 147.

FIG. 9 is a diagram showing a history non-use aQ2 and a history use aQ2.

The history non-use aQ2 is an aQ2 that does not use the aQ history group 147. According to the history non-use aQ2, the acquisition source of the data set is the patient_table 300.

The history use aQ2 is a Q2 that uses the aQ history group 147. According to the history use aQ2, the acquisition source of the data set is not the patient_table 300, but is at least one aQx history 600 (aQ1_output 601 and aQ1_unA 602 (or aQ1_list 603) according to the illustrated example).

In the present embodiment, for the received query Qx, the anonymization processing unit 140 determines whether or not the use of the aQ history group 147 is possible. If the result of the determination is true, a history use aQx is generated. The determination as to whether or not the aQ history group 147 can be used may determine whether a target anonymization processing range is a subset (including a perfect match) of one or more anonymization processing ranges corresponding to the one or more aQx histories 600. Specifically, the determination is, for example, determination of whether or not both of the following conditions A and B are satisfied. Condition A: The target search range (excluding the conversion rule from the anonymization processing range) is a subset (including a perfect match) of one or more search ranges corresponding to one or more aQx histories 600. Condition B: The processed data set according to a target conversion rule can be acquired from one or more aQx histories 600 that satisfy the condition A.

An example in which the condition A is satisfied is as follows with reference to FIG. 10.

As indicated by the reference numeral 1010, a search range of an aQ12 is a subset of a search range corresponding to an aQ11 history.

As indicated by the reference numeral 1020, a search range of an aQ16 is a subset of two search ranges corresponding to an aQ14 history and an aQ15 history, respectively. (Specifically, for example, the search range of the aQ16 is "all ages", the search range corresponding to the aQ14 history is "under 30 years old", and the search range corresponding to the aQ15 history is "30 years old or older".)

An example in which the condition B is satisfied is as follows.

The data set acquired from the aQx history 600 is an unprocessed data set. The reason is that any attribute value in the unprocessed data set can be processed according to the conversion rule.

Even if the data set acquired from the aQ history 600 is a processed dataset, all the processed attribute values included in the processed data set correspond to all or a part of the attribute values processed according to the target conversion rule.

In the present embodiment, as illustrated in FIG. 9, first, a history non-use aQx is generated. Thereafter, a determination of whether or not the aQ history group 147 can be used is performed. If the result of the determination is true, the history non-use aQx is converted into the history use aQx. Generation of the history non-use aQx may be skipped. Specifically, first, determination of whether or not the aQ history group 147 can be used may be performed. If the determination result is true, the history use aQx may be generated based on the query Qx without generating the history non-use aQx.

FIG. 11 is a diagram showing an example of history setting information.

History setting information 1100 is information for controlling the use and storage of the aQ history group 147. The history setting information 1100 is, for example, setting information for each user, and may be included in the definition information 145. The history setting information 1100 includes, for example, information such as a use flag 1101, an execution flag 1102, a list storage upper limit 1103, a unA storage upper limit 1104, a query number upper limit 1105, a query capacity upper limit 1106, and a share flag 1107. Hereinafter, regarding the above information 1101 to 1107, one user is taken as an example ("target user" in the description of FIG. 11). Although not shown, the history setting information 1100 may include a user ID of the target user.

The use flag 1101 is a flag indicating whether or not the aQ history group 147 is to be used in execution of the aQx of the target user. "Y" means that the aQ history group 147 is to be used.

The execution flag 1102 is a flag indicating whether or not an anonymization result that is information related to execution of aQx for the target user is to be stored (included in the aQx history 600). "y" means that the anonymization result is to be stored. The information 1102 is useful in the second embodiment, and may not be provided in the first embodiment.

The list storage upper limit 1103 indicates an upper limit of the loss rate serving as a criterion for determining whether or not the aQx list 603 is to be stored for the aQx of the target user. If the loss rate exceeds the list storage upper limit 1103, the aQ1_list 603 is not stored. The reason is that if the loss rate exceeds the list storage upper limit 1103, it is faster to scan the patient_table 300 as a whole than using both the aQ1_output 601 and the aQ1_list 603. The loss rate upper limit may be determined based on the I/O performance with respect to the patient_table 300. For example, a formula that the loss rate upper limit=(throughput of random I/O to patient_table 300)=(throughput of sequential I/O to patient_table 300)×100 may be used.

The unA storage upper limit 1104 indicates a non-output capacity upper limit serving as a criterion for determining whether or not the aQx_unA 602 is to be stored for the aQx of the target user. The "non-output capacity" is a total capacity of the non-output unprocessed data sets (original data set of the processed data set that does not satisfy the anonymization processing condition) acquired in the execution of the aQx. When the non-output capacity is equal to or less than the unA storage upper limit 1104, the aQx_unA 602 is stored.

The query number upper limit 1105 indicates an upper limit of the number of queries that can be managed for the target user.

The overall query capacity upper limit 1106 indicates an upper limit of the overall query capacity, which is the total capacity of the queries that can be managed for the target user. When the overall query capacity reaches the upper limit (overall query capacity upper limit 1106) even if the number of queries is equal to or less than the upper limit (query number upper limit 1105), the latest query can be managed by deleting any of the queries being managed (for example, the oldest query). Managing the query means storing the query Qx itself (and/or the anonymization processing query aQx itself) in the aQx history 600. Therefore, the query number upper limit 1105 and the overall query capacity upper limit 1106 correspond to information for limiting the number of the aQx histories 600.

The share flag 1107 is a flag indicating whether or not to permit the use of the aQx history 600 corresponding to the target user in execution of a query for a user other than the target user. "y" means permission.

Figure 12:
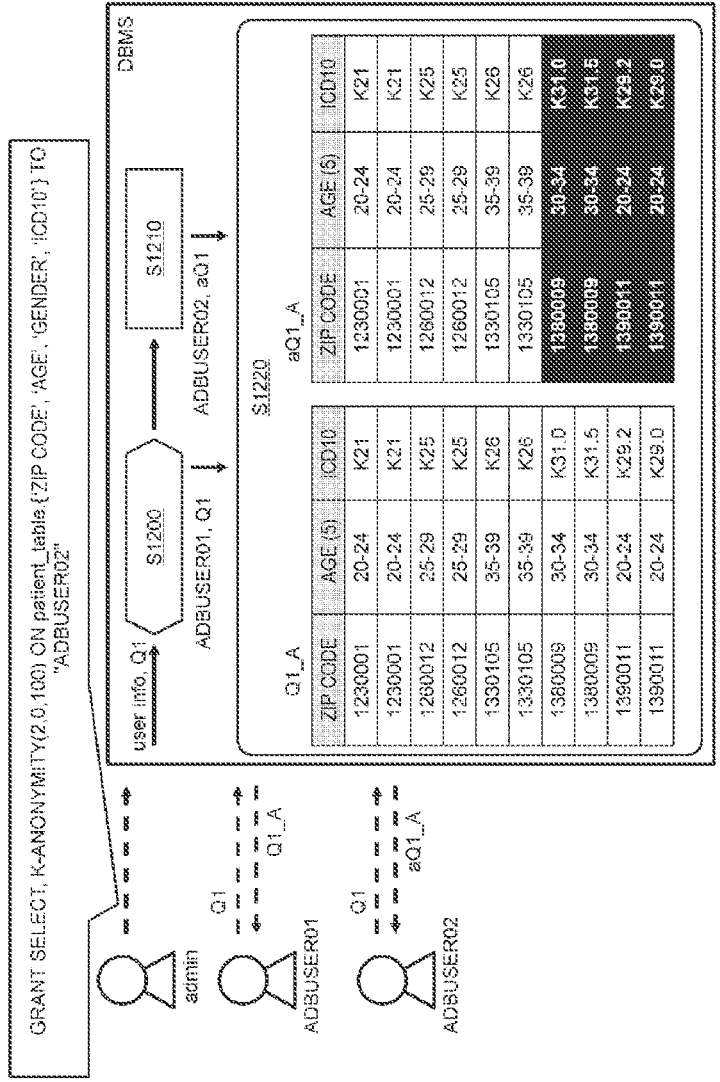
FIG. 12 is a diagram showing an example of respective cases of execution and non-execution of the anonymization processing.

FIG. 12 is a diagram showing an example of cases of execution and non-execution of the anonymization processing.

According to FIG. 12, k-anonymization is adopted as an example of the anonymization processing. An administrator (admin) defines how to perform k-anonymization for a query from any user. That is, the target of the anonymziation processing can be specified in units of users, in units of relationship tables, and in units of queries. Which user or which relationship table is the target of the anonymization processing may be defined in advance by the administrator. Which query is the target of the anonymization processing may be defined in advance by the administrator or may be specified by the user. In the latter case, if the query includes the conversion rule, the query may be the target of the anonymization processing.

According to the example of FIG. 12, the administrator specifies the user who is the target of the anonymization processing, the relationship table and the attribute item that is the target of the anonymization processing, the anonymization processing condition for the user, and the loss rate range. Specifically, for example, the administrator sets information "GRANT SELECT, K-ANONYMITY (2, 0, 100) ON patient_table. ¥{'ZIP code', 'age', 'gender', 'ICD10'} TO "ADBUSER02" in the DBMS 130. The information may be included in the definition information 145, for example.

In the information, the "K-ANONYMITY (2, 0, 100)" is an anonymization processing condition and an output condition. The anonymization processing condition is k≥2. The loss rate range is 0% or more and 100% or less. At least one of the lower limit and the upper limit of the loss rate range may be a random number. Therefore, the reproducibility can be reduced, thereby reducing the risk that an identifier (for example, an individual name or ID) may be identified.

In the information, the "ON patient_table. {'ZIP code', 'age', 'gender', 'ICD10'" means that at least one of the ZIP code value, age value, gender value, and ICD10 value of the patient_table 300 may be a target of the k-anonymization.

In the information, the "TO 'ADBUSER02'" means that a query for a user "ADBUSER02" (a user to which the user ID "ADBUSER02" is allocated) is a target of the k-anonymization. It is also possible to adopt a specified method such as a user other than the user "ADBUSER01".

According to the definition illustrated in FIG. 12, the following processing is performed.

That is, the query receiving unit 131 receives the user ID (an example of user information) and the query Q1. The anonymization processing unit 140 determines whether or not the received user ID is the user ID of the user who is the target of the anonymization processing and whether or not the query Q1 is the target of the anonymization processing (S1200). Whether or not the received user ID is the user ID of the user who is the target of the anonymization processing can be determined based on the definition information set by the administrator. Whether or not the query Q1 is the target of the anonymization processing can be determined based on the definition information set by the administrator or based on whether or not the query Q1 includes the conversion rule.

If the result of the determination of S1200 is false (for example, query Q1 is a query for user "DBUSER01"), the query Q1 is not converted to the anonymization processing query aQ1. That is, the query plan generation unit 132 generates a query plan for the query Q1 itself, and the query execution unit 133 executes the query Q1 based on the query plan. As a result, the query response unit 134 returns a query response Q1_A indicating the execution result of the query Q1 itself. Since the query Q1 includes the conversion rule but does not include the anonymization processing condition such as the k value, as illustrated in FIG. 12, in the query response Q1_A, all acquired processed data sets are output targets regardless of the k value actually obtained.

If the result of the determination of S1200 is true (for example, the query Q1 is a query for user "ADBUSER02"), the query Q1 is converted to the anonymization processing query aQ1. As a result, as described above, the query plan generation unit 132 generates a query plan aQ1_P for the aQ1, and the query execution unit 133 executes the query aQ1 based on the query plan aQ1_P. The query response unit 134 returns the query response aQ1_A for the query Q1. Since the aQ1 includes an anonymization processing condition such as a k value in addition to the conversion rule, as illustrated in FIG. 12, in the query response aQ1_A, a processed data set that does not satisfy the k value is a non-output target.

An example of the flow of processing performed in the present embodiment will be described below. In the present embodiment, in the following description, the received query (latest query) is referred to as a "query Qn", and each of one or more previous queries (past queries) is referred to as a "query Qm".

Figure 13:
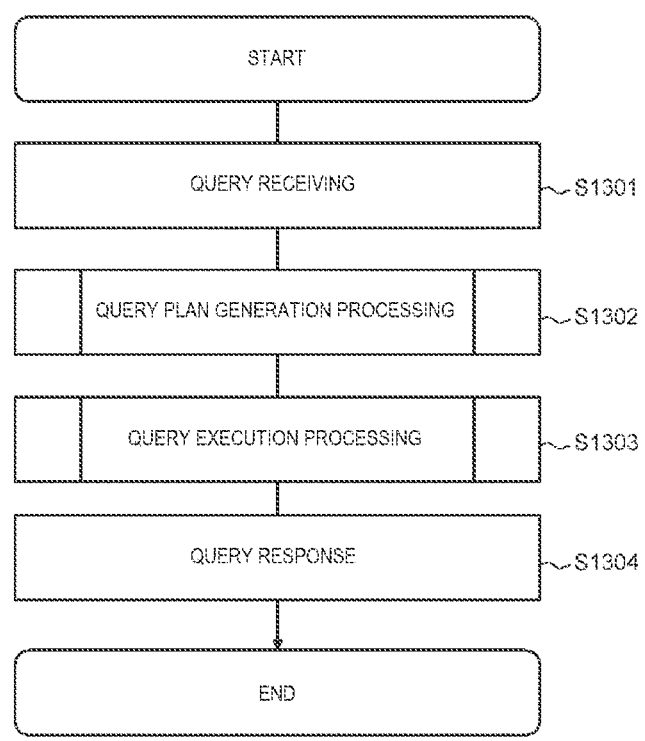
FIG. 13 is a flowchart showing a flow of entire processing (processing from receiving a query to response) according to the first embodiment.

FIG. 13 is a flowchart showing a flow of entire processing (processing from receiving a query to response) according to the present embodiment.

The query receiving unit 131 receives the query Qn from the client 190 (S1301).

The query plan generation unit 132 performs query plan generation processing for the query Qn (S1302). The generated query plan is a query plan for the query Qn itself or the anonymously processed query aQn generated based on the query Qn.

The query execution unit 133 performs query execution processing based on the query plan generated in S1302 (S1303).

The query response unit 134 returns a query response according to the result of S1303 to the client 190 (S1304).

Figure 14:
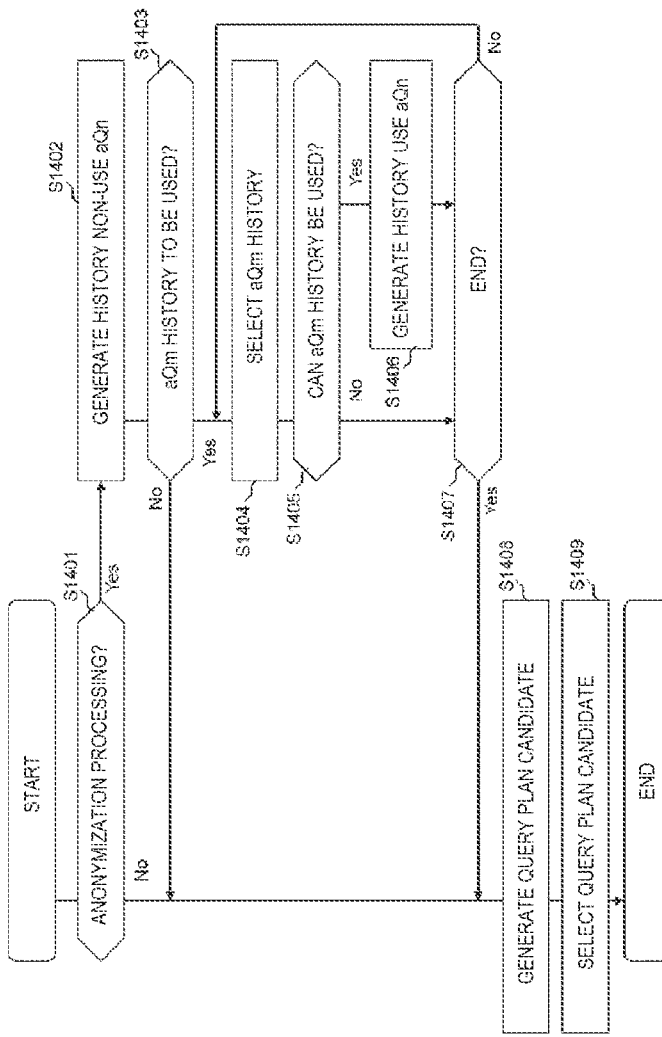
FIG. 14 is a flowchart showing a flow of query plan generation processing.

FIG. 14 is a flowchart showing a flow of the query plan generation processing.

The anonymization processing unit 140 determines whether or not the query Qn is a target of the anonymization processing, specifically, for example, whether or not the user of the query Qn is the target of the anonymization processing based on information defined by the administrator (S1401).

If the determination result of S1401 is false (S1401: No), the candidate generation unit 141 generates one or more query plan candidates for the query Qn (S1408). The cost calculation unit 142 calculates the cost of each query plan candidate, and the candidate selection unit 143 selects one query plan candidate (for example, a query plan candidate having the lowest cost) based on the calculated cost of each query plan candidate (S1409). The query plan candidate selected in S1409 corresponds to the generated query plan.

If the determination result of S1401 is true (S1401: Yes), the anonymization processing unit 140 converts the query Qn to a history non-use aQn (S1402). Then, the anonymization processing unit 140 determines whether or not the aQ history group 147 is to be used, specifically, whether or not the use flag 1101 in the history setting information 1100 corresponding to the user of the query Qn is "y" (S1403).

If the determination result of S1403 is false (S1403: No), the candidate generation unit 141 generates one or more query plan candidates for the history non-use aQn (S1408). After that, S1409 is performed.

If the determination result of S1403 is true (S1403: Yes), the anonymization processing unit 140 selects one or a plurality of aQm histories 600 (S1404). The anonymization processing unit 140 determines whether or not the aQm history 600 selected in S1404 can be used (S1405). As described above, the determination may be a determination as to whether or not the anonymization processing range of the aQn is a subset (including perfect match) of the anonymization processing range corresponding to all the aQm histories 600 selected in S1404.

If the determination result of S1405 is false (S1405: No), the processing moves to S1407, which will be described later.

If the determination result of S1405 is true (S1405: Yes), the anonymization processing unit 140 converts the history non-use aQn to the history use aQn (S1406). The anonymization processing unit 140 determines whether or not the selection of the aQm history 600 is ended (for example, whether or not r kinds (r is a natural number) have been selected) (S1407). Here, for example, when all kinds of selections are made, the determination result of S1407 is true. If the determination result of S1407 is false (S1407: No), S1404 is performed again. That is, according to the present embodiment, one or more aQns may be generated for one query Qn.

If the determination result of S1407 is true (S1407: YES), S1408 is performed for all of the aQn, and one query plan candidate is selected from all the generated query plan candidates in S1409. In the query execution unit 133, aQn corresponding to the query plan candidate is executed based on the query plan candidate (generated query plan) selected in step S1409.

If the query plan candidate selected in S1409 is a query plan candidate corresponding to the history use aQn, at least a part of the data sets are acquired from the existing aQm_output 601 and is not acquired from the database 146 in the execution of the aQn.

Figure 15:
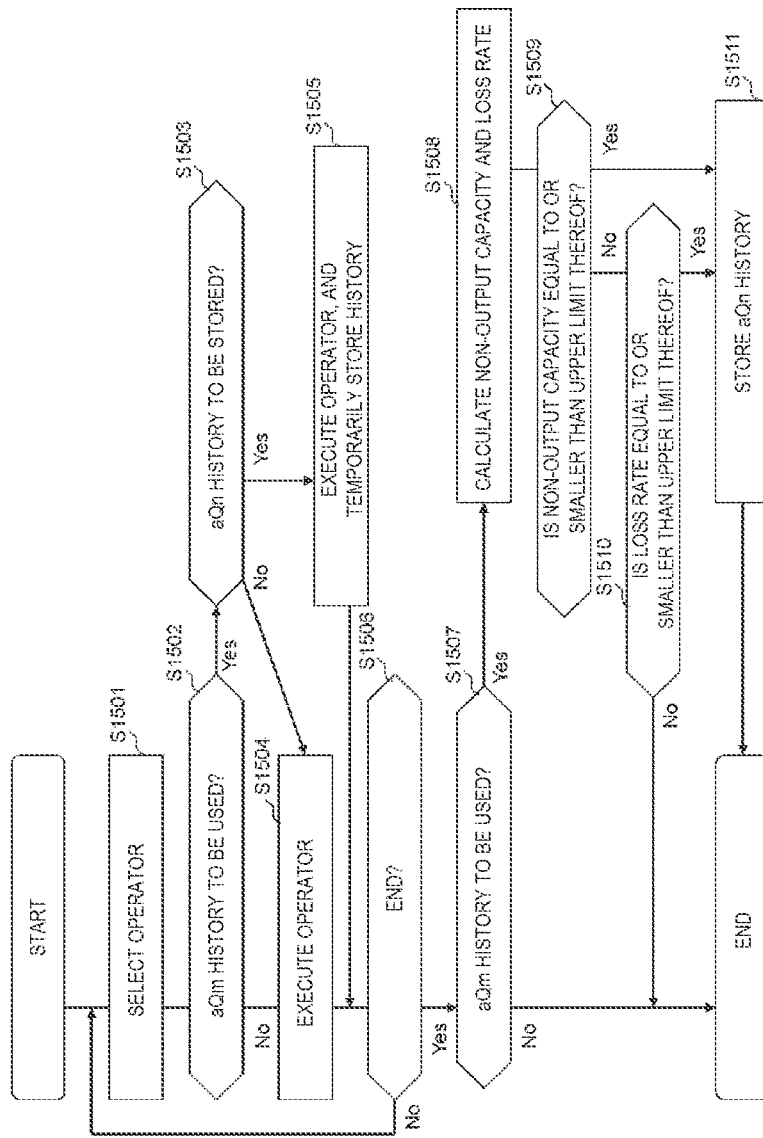
FIG. 15 is a flowchart showing a flow of query execution processing.

FIG. 15 is a flowchart showing a flow of the query execution processing.

The query execution unit 133 selects one database operator from the query plan generated in the query plan generation processing (S1501).

When the aQn corresponding to the query plan is a history non-use aQn, or the query plan is the query plan of the query Qn (S1502: No), the query execution unit 133 executes the database operator selected in S1501 without referring to any history 600 (S1504).

On the other hand, when the aQn corresponding to the query plan is a history use aQn (S1502: Yes), the query execution unit 133 determines whether the loss rate is the upper limit (list storage upper limit 1103) or less or the non-output capacity is the upper limit (unA storage upper limit 1104) or less for the database operator that has already been executed for aQn (S1503).

If the determination result of S1503 is true (S1503: Yes), the query execution unit 133 executes the database operator selected in S1501, at this time, the output processed data set included in the query response aQn_A is temporarily stored in, for example, a work area, and information that can be stored as the aQn history 600 (an output unprocessed data set, a non-output unprocessed data set, and a pointer to a tuple including the non-output unprocessed data set) is temporarily stored in, for example, a work area (S1505). If the determination result of S1503 is false (S1503: No), the query execution unit 133 executes the database operator selected in S1501 (S1504).

After S1504 or S1505, the query execution unit 133 determines whether or not there is at least one unselected database operator (S1506). If the determination result of S1506 is false (S1506: No), the query execution unit 133 performs S1501 for an unselected database operator.

If the determination result of S1506 is true (S1506: Yes), all the database operators are executed, and all the output processed data sets that can be included in the query response aQn_A are stored. The query execution unit 133 determines whether or not the determination in S1503 is performed for the last selected database operator and whether or not the result of the determination is true (S1507).

If the determination result of S1507 is false (S1507: No), the processing is ended since the storage of the aQn history 600 is not necessary.

If the determination result of S1507 is true (S1507: Yes), the processing proceeds to S1508 and subsequent steps in order to check whether the upper limits of the loss rate and the non-output capacity are satisfied as a result of executing the last selected database operator. That is, the query execution unit 133 calculates the loss rate and the non-output capacity for the aQn (S1508).

If the non-output capacity is equal to or smaller than the upper limit (unA storage upper limit 1104) (S1509: Yes), the query execution unit 133 stores the aQn history 600 including an aQn_output 301 and an aQn_unA 602 (S1511).

If the non-output capacity exceeds the upper limit (unA storage upper limit 1104) but the loss rate is equal to or smaller than the upper limit (list storage upper limit 1103) (S1509: No, S1510: Yes), the query execution unit 133 stores the aQn history 600 including the aQn_output 301 and the aQn_list 603 (S1511).

If the non-output capacity exceeds the upper limit (unA storage upper limit 1104) and the loss rate exceeds the upper limit (list storage upper limit 1103) (S1509: No, S1510: No), the processing is ended without storing the aQn history 600.

A query response including the output processed data set obtained in the query execution processing is transmitted to the client 190 by the query response unit 164. When the aQn is the history use aQn, in S1504 or S1505, the query execution unit 133 acquires the unprocessed data set from one or more aQm histories 600 according to the aQn_P, and converts the unprocessed data set into the processed data set in accordance with the conversion rule of the aQn.

The first embodiment has been described above. At least one of the following may be adopted in the first embodiment.

A storage device usage capacity including one or more (for example, all) aQm_output 301 capacity and one or more (for example, all) aQm_unA602 capacity may be adopted instead of or in addition to the non-output capacity.

The query execution unit 133 may store the aQn_unA 602 when the storage device usage capacity is equal to or less than the upper limit (or when the loss rate exceeds the upper limit) in execution of the aQn.

The query execution unit 133 may store the aQn_list 603 when the loss rate is equal to or less than the upper limit (or when the storage device usage capacity exceeds the upper limit) in execution of the aQn.

Second Embodiment

A second embodiment will be described below. In this case, a difference with the first embodiment will be mainly described, and the description of the point common to the first embodiment will be omitted or simplified.

In the second embodiment, although it is common to the first embodiment that the query that is the basis for generating an anonymization processing query is necessary, a plurality of anonymization processing queries can be generated from one query until a query response that satisfies the output condition is obtained. That is, generation of the anonymization processing query is semi-automated. Thus, the user is likely to obtain a satisfactory query response without issuing a plurality of queries.

Figure 16:
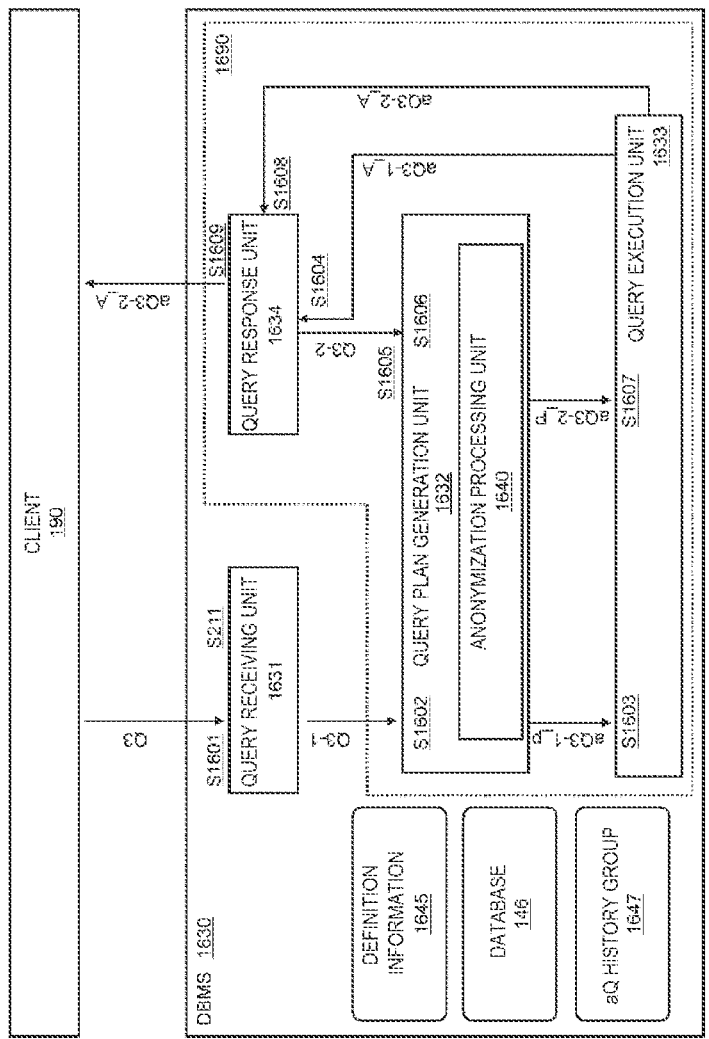
FIG. 16 is a schematic diagram of a flow of an anonymization processing according to a second embodiment.

FIG. 16 is a schematic diagram of a flow of anonymization processing according to a second embodiment. In FIG. 16, elements having the same names as those of the first embodiment but having at least one function and configuration different from those of the first embodiment are denoted by different reference numerals.

A DBMS 1630 includes a query receiving unit 1631 and a query processing unit 1690.

The query receiving unit 1631 receives a query Q3 including the conversion rule from the client 190, generates one or more conversion rules based on the conversion rule included in the query Q3, and generates one or more queries including the one or more conversion rules (S1601). In the following description of the present embodiment, a query derived from a received query Qx (automatically generated based on the query Qx) is referred to as an "internal query Qx-y" (y is a natural number). The internal query generated in S1601 may be one internal query, or may be all internal queries that can be generated from the query Qx.

In a query plan generation unit 1632, an anonymization processing query aQ3-1 based on one internal query Q3-1 (an example of a third query) including the conversion rule (an example of a third conversion rule) is generated by the anonymization processing unit 1640, and a query plan aQ3-1_P based on the aQ3-1 is generated (S1602).

A query execution unit 1633 executes the aQ3-1 according to the aQ3-1_P (S1603).

A query response unit 1634 determines whether or not a query response aQ3-1_A according to the execution result of the aQ3-1 satisfies a predetermined output condition (for example, a predetermined loss rate range) (S1604). If the determination result of S1604 is false, the query response unit 1634 generates or selects another internal query Q3-2 including another conversion rule (an example of a fourth conversion rule) (S1605). The same processing as in S1602 and S1603 is performed for the internal query Q3-2 (S1606 and S1607). As a result, a query response aQ3-2_A is obtained according to the generation and execution of the anonymization processing query aQ3-2.

The query response unit 1634 determines whether or not the query response aQ3-2_A satisfies the predetermined output condition (S1608). If the determination result of S1608 is true, the query response unit 1634 returns the query response aQ3-2_A to the client 190 as a response to the query Q3 (S1609).

As described above, one or more internal queries (specifically, one or more conversion rules obtained based on the conversion rule included in the one query Q3) are executed based on the one query Q3.

Figure 17:
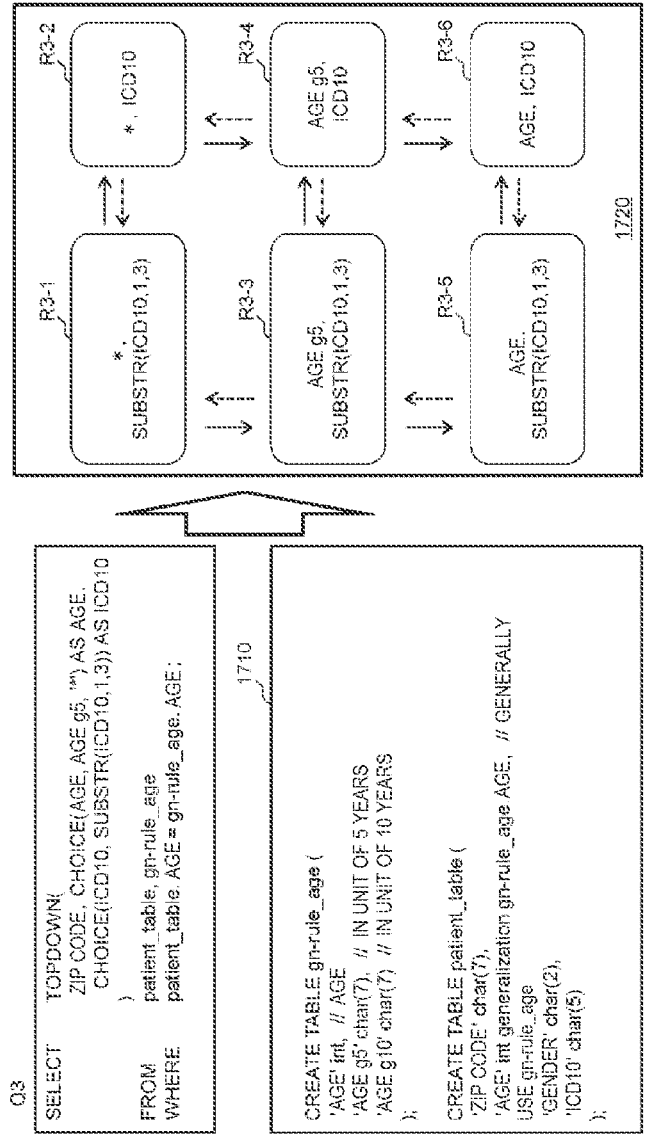
FIG. 17 is an illustrative diagram of an example of semi-automatic execution of the anonymization processing.

FIG. 17 is an illustrative diagram of an example of semi-automatic execution of the anonymization processing.

According to the reference numeral 1710, in the semi-automatic execution of the anonymization processing, which anonymization processing rule is applied to the anonymization processing of which attribute value of the attribute item is defined in advance. Specifically, it is defined in advance that gn-rule_age 350 is to be applied to the attribute value of the attribute item "age" in patient_table 300. In the present embodiment, the attribute item "age" in the patient_table 300 is associated with the gn-rule_age 350.

The semi-automatic execution of the anonymization processing is clearly indicated in the query Q3. Specifically, the anonymization processing range specified by the query Q3 includes at least one attribute item with which the conversion rule is associated, and if there is a description of two or more elements (a combination of two or more anonymization processing rules, or a combination of a specification that the anonymization processing is not required and at least one anonymization processing rule) for the attribute item, the query Q3 is a query in which the semi-automatic execution of the anonymization processing query is clearly indicated (specified). Examples of the description includes the description "CHOICE (age, age g5, '*')" for the attribute item "age" and the description "CHOICE (ICD10, SUBSTR (ICD10, 1, 3)" for the attribute item "ICD10". The description "CHOICE ( )" means that an attribute value (unprocessed attribute value or processed attribute value) according to each element in ( ) is used as an argument, and one of the arguments is selected. Each of the "age" and the "ICD10" corresponds to an element as a specification that the anonymization processing is not required. Each of the "age g5", "*", and "SUBSTR (ICD10, 1, 3)" corresponds to an anonymization processing rule.

The number (=C) of conversion rules (internal queries) is determined according to the number (=A) of the description "CHOICE ( )" and the number of elements (=B) included in each description "CHOICE ( )". Specifically, C=A×B is satisfied. In the illustrated example, since the number of elements included in the description "CHOICE (age, age g5, *)" is three and the number of elements included in the description "CHOICE (ICD10, SUBSTR (ICD10, 1, 3)" is two, six internal queries Q3-1 to Q3-6 including six conversion rules R3-1 to R3-6 are obtained.

In the figure, for the six conversion rules R3-1 to R3-6, the closer to the left and above, the higher the abstraction level (anonymization degree) is, in other words, the closer to the right and below, the lower the abstraction level is. The element "*" means that the processed attribute value is represented as "*" regardless of the size of the unprocessed attribute value. In the present embodiment, a CHOICE execution plan 1720 (which may be referred to as "semi-automatic execution plan" or "anonymization execution plan") is generated in which the conversion rules R3-1 to R3-6 that can be generated from the conversion rule of the query Q3 (conversion rule including the "CHOICE ( )") are arranged in the order of the abstraction level. Specifically, for example, based on the conversion rule included in the received query Q3, the query receiving unit 1631 generates the CHOICE execution plan 1720 in which the conversion rules R3-1 to R3-6 are arranged in the order of the abstraction level. The generated CHOICE execution plan 1720 is stored in, for example, a storage area (storage area in the storage device 150A) that can be referred to by the query response unit 1634.

Thus, the abstraction level according to the conversion rule is different. Therefore, in the query Q3, a rule selection order that is an order of selecting the conversion rule can be specified. The illustrated "TOPDOWN ( )" is an example of the specification of the rule selection order. The "TOPDOWN ( )" means selecting the obtained conversion rule in descending order of abstraction level (descending order of abstraction level) (selecting in the order of solid arrows in the CHOICE execution plan 1720). Other examples may also be adopted as a specification of the rule selection order. For example, although not shown, it is also possible to adopt "BOTTOMUP ( )". The "BOTTOMUP ( )" means selecting the obtained conversion rules in ascending order of abstraction level (ascending order of abstraction level) (selecting in the order of dashed arrows in the CHOICE execution plan 1720). In the CHOICE execution plan 1720, the conversion rules R3-1 to R3-6 are arranged according to the rule selection order specified by the query Q3.

Figure 18:
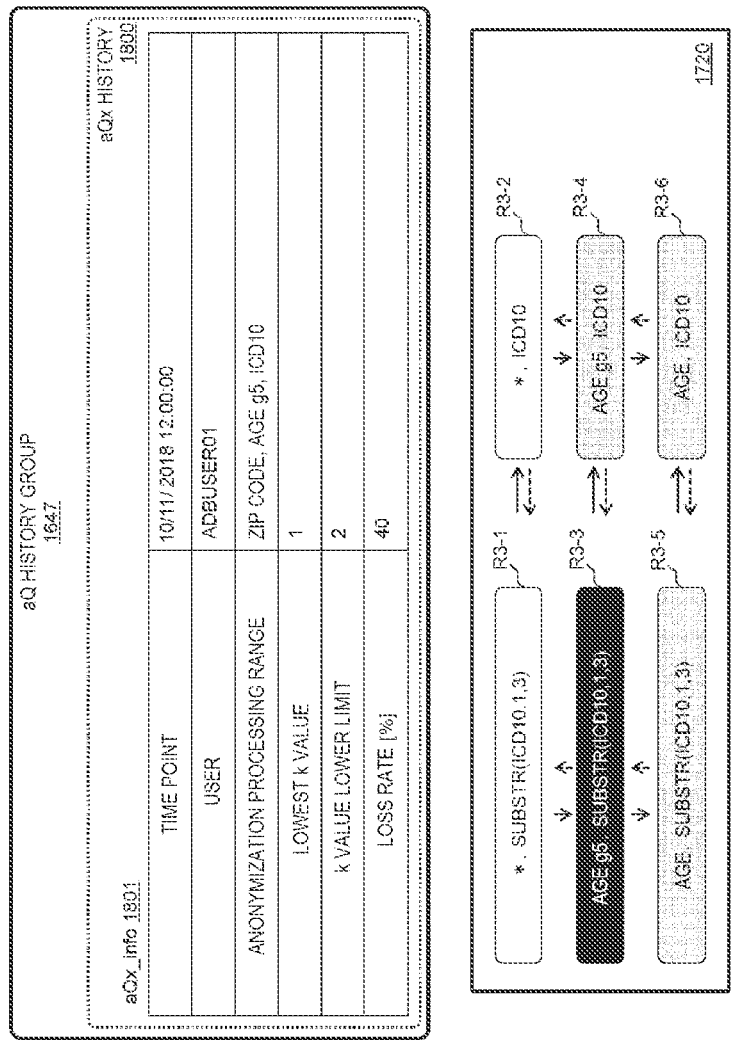
FIG. 18 is an illustrative diagram of an example of efficiency of the semi-automatic execution.

FIG. 18 is an illustrative diagram of an example of efficiency of the semi-automatic execution.

A large number of internal queries may be generated based on one query in semi-automated execution of the anonymization processing. It always takes a long time to to process the received queries when executing all of the internal queries, resulting in a decrease in the response performance of the query.

Therefore, in the present embodiment, in order to avoid an increase in the time required for query processing, aQx_info 1801, which is an example of an anonymization processing result (information on the result of executing the anonymization processing query), is included in an aQx history 1800 as illustrated. The aQx_info 1801 includes, for example, information indicating an execution time point of aQx, the user ID, the anonymization processing range, the minimum k value (minimum value of the k values obtained in execution of the aQx), the k value lower limit (anonymization condition), and the loss rate. The aQx_info 1801 may further include success/failure information indicating whether or not the aQx_A satisfies the output condition.

The query response unit 1634 can refer to any of the CHOICE execution plan 1720 and the aQx_info 1801 of the past query to determine, based on the abstraction level of the conversion rule included in the latest internal query and whether or not the response of the latest internal query satisfies the output condition of the derived query, whether or not a response of an next internal query including a next conversion rule according to the rule selection order satisfies the output condition without executing the next internal query. If the result of the determination is false, the query response unit 1634 may end the query without executing remaining internal queries including the next internal query (details will be described later).

Figure 19:
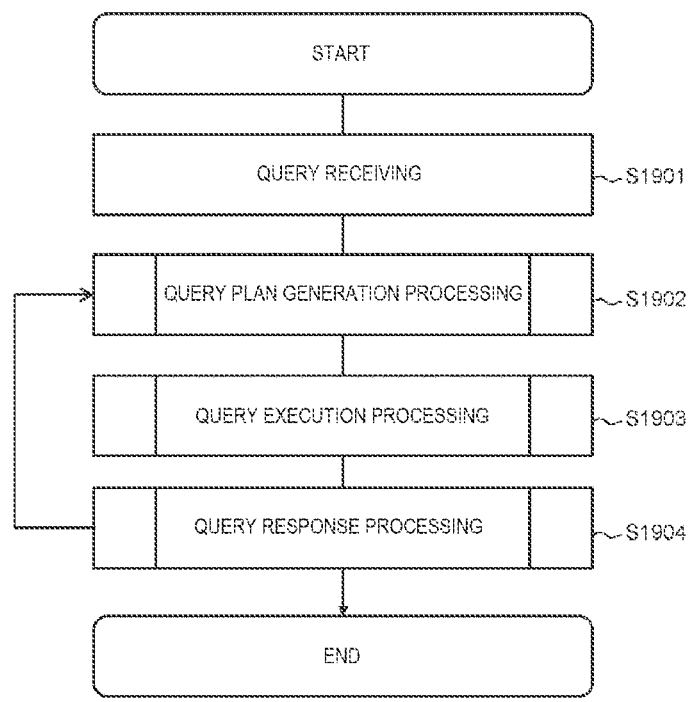
FIG. 19 is a flowchart showing a flow of entire processing according to the second embodiment.

FIG. 19 is a flowchart showing a flow of entire processing according to the present embodiment.

The query receiving unit 1631 receives the query Q3 from the client 190 (S1901). In S1901, when detecting that there is a clear indication ("CHOICE ( )") of the semi-automatic execution of the anonymization processing in the received query Q3, the query receiving unit 1631 generates the CHOICE execution plan 1720 in which the conversion rules R3-1 to R3-6 are arranged in the order of the abstraction level based on the conversion rules included in the query Q3. Based on the CHOICE execution plan 1720, the query receiving unit 1631 generates an internal query Q3-1 including at least the conversion rule R3-1 to be selected first among the conversion rules R3-1 to R3-6. At this stage, internal queries Q3-2 to Q3-6 including the remaining conversion rules R3-2 to R3-6 respectively may be generated.

The query plan generation unit 1632 performs query plan generation processing for the internal query Q3-1 (S1902).

The query execution unit 1633 performs query execution processing based on a query plan Q3-1_P generated in S1902 (S1903).

The query response unit 1634 performs query response processing including a determination as to whether or not to output the query response Q3-1_A according to the result of S1903 (S1904).

FIG. 20 is a flowchart showing a flow of the query response processing.

The query response unit 1634 determines whether or not the query response Q3-1_A satisfies a predetermined output condition (S2001).

If the determination result of S2001 is true (S2001: Yes), the query response unit 1634 returns the query response Q3-1_A to the client 190. That is, the query response is returned at a time point when the query response satisfying the predetermined output condition is found. As a result, a result satisfied by the user can be returned at a high speed. Even if there is still an internal query that satisfies the predetermined output condition, considering the arrangement of the conversion rules in accordance with the rule selection order and the abstraction level, it is considered that the query response found is most likely to satisfy the user, and returning such a query response can maximize the response performance of the query.

If the determination result of S2001 is false (S2001: No), the query response unit 1634 determines whether or not the query response Q3-1_A is a processing target of the semi-automatic execution (that is, whether or not there is the CHOICE execution plan 1720) (S2002). If the determination result of S2002 is false (S2002: No), the query response unit 1634 generates a query response including none (S2007), and returns the query response to the client 190 (S2008).

If the determination result of S2002 is true (S2002: Yes), the query response unit 1634 determines whether or not all internal queries are generated or selected (S2003). If the determination result of S2003 is true (S2003: Yes), S2007 and S2008 are performed.

If the determination result of S2003 is false (S2003: No), the query response unit 1634 generates or selects a next internal query Q3-*n* (n=2 and/or n=3) according to the rule selection order specified in the query Q3 based on the CHOICE execution plan 1720 (S2004). In the present embodiment, each of one or more previous queries processed before the internal query Q3-*n* is referred to as a "query Qm". The query Qm may be another internal query derived from the query Q3, may be any internal query derived from a query different from the query Q3, or may be a query different from the query Q3.

Based on the CHOICE execution plan 1720, the query response unit 1634 determines whether or not the response of the internal query Q3-*n* generated or selected in S2004 has a possibility of success (possibility of satisfying the output condition) (S2005). Specifically, for example, at least one of the following may be applicable.

When the rule selection order is "TOPDOWN ( )", the conversion rule R3-1 previous to the conversion rule R3-*n* has a high abstraction level and the response of the previous internal query Q3-1 fails (output condition is not satisfied), it is determined that the response of the internal query Q3-*n* fails (S2005: No).

When the rule selection order is "TOPDOWN ( )", the conversion rule R3-1 previous to the conversion rule R3-*n* has a high abstraction level, the response of the previous internal query Q3-1 is successful, and the query response does not necessarily return to the client 190 even if the response of the internal query is successful (for example, when all of the top X % conversion rules according to the rule selection order are to be tried), it is determined that the response of the internal query Q3-$n$ has a possibility of success (S2005: Yes).

When the rule selection order is "BOTTOMUP ( )", the conversion rule R3-1 previous to the conversion rule R3-$n$ has a low abstraction level and the response of the previous internal query Q3-1 fails (the output condition is not satisfied), it is determined that the response of the internal query Q3-$n$ fails (S2005: No).

When the rule selection order is "BOTTOMUP ( )", the conversion rule R3-1 previous to the conversion rule R3-$n$ has a low abstraction level, the response of the previous internal query Q3-1 is successful, and the query response does not necessarily return to the client 190 even if the response of the internal query is successful, it is determined that the response of the internal query Q3-$n$ has a possibility of success (S2005: Yes).

If the determination result of S2005 is false (S2005: No), even if the internal query Q3-$n$ generated or selected in S2004 is executed, there is no possibility that the query response aQ3-$n$_A satisfies the predetermined output condition. Therefore, the processing returns to S2003 without executing the internal query.

If the determination result of S2005 is true (S2005: Yes), when there is at least one aQm history 1801 including existing aQm_info 1801 indicating an anonymization processing range including the anonymization processing range of the internal query Q3-$n$ generated or selected in S2004 as a subset, the query response unit 1634 determines whether or not the response of the internal query Q3-$n$ generated or selected in S2004 has a possibility of success based on the at least one aQm history 1801 (S2006). The above determination is performed based on whether or not the aQm_A satisfies the output condition (specifically, for example, the minimum k value, the k value lower limit and the loss rate in the aQm_info1801), the anonymization condition (k value lower limit) of the internal query Q3-$n$, the output condition (loss rate range) of the query Q3, the abstraction level of the conversion rule included in the query Qm, and the abstraction level of the conversion rule R3-$n$ included in the internal query Q3-$n$.

If the determination result of S2006 is true (S2006: Yes), the query response aQ3-$n$_A may satisfy a predetermined output condition if the internal query Q3-$n$ generated or selected in S2004 is executed. Therefore, the query response unit 1634 specifies the selected internal query Q3-$n$ to the anonymization processing unit 1640. As a result, the query plan generation processing is performed for the internal query Q3-$n$.

If the determination result of S2006 is false (S2006: No), even if the internal query Q3-$n$ generated or selected in S2004 is executed, there is no possibility that the query response aQ3-$n$_A satisfies the predetermined output condition. Therefore, the processing returns to S2003 without executing the internal query.

In the second embodiment, similarly to the first embodiment, by using already materialized processing results, it is possible to avoid reacquiring all tuples from the database every time the reprocessing is performed.

The internal query may not necessarily be generated, and the anonymization processing range including the conversion rule may be automatically generated based on the original query.

Although several embodiments have been described above, these are examples for illustrating the invention, and the scope of the invention is not intended to be limited to the above embodiments. The invention can be implemented in various other forms. For example, the first embodiment and the second embodiment may be combined. Specifically, for example, when the received query includes a clear indication (for example, "CHOICE ( )") of a plurality of kinds of conversion rules, the processing in the second embodiment may be performed, and if not, the processing in the first embodiment may be performed.

The above description can be summarized as follows. The following summary may include matters not described in the above description.

A DBMS (130, 1630) manages a database that stores a relationship table including tuples each including a plurality of attribute values respectively corresponding to a plurality of attribute items. The DBMS includes a query receiving unit (131, 1631) and a query processing unit (190, 1690).

The query receiving unit receives a query including a specification of an anonymization processing range associated with conversion rules. The anonymization processing range is one or more attribute items to be read, and a conversion rule is included in (associated with) at least one of the one or more attribute items.

The query processing unit performs (x1) to (x3) for the received query. (x1) The query processing unit determines whether or not one or more anonymization processing histories of an anonymization processing history group (one or more anonymization processing histories) can be used based on a target anonymization processing range which is an anonymization processing range including a target conversion rule. The "anonymization processing range" may include a condition related to an attribute value to be read for at least one attribute item. The "target conversion rule" may be a conversion rule itself included in the received query as in the first embodiment, or may be a conversion rule obtained based on the conversion rule included in the received query (obtained by semi-automation) as in the second embodiment. Each of the anonymization processing histories is an aQx history as an example and includes an output intermediate result. For each anonymization processing history, the output intermediate result includes one or more output data sets. Each output data set is one or a plurality of processed data sets or unprocessed data sets thereof that satisfy the anonymization processing conditions in the past anonymization processing corresponding to the anonymization processing history including the output data set. A "processed data set" is constituted by one or more attribute values including at least one anonymously processed attribute value. The "unprocessed data set" is constituted by one or more unprocessed attribute values. (x2) If the determination result of (x1) is true, the query processing unit preferentially acquires at least a part of the processed data sets among the processed data sets corresponding to the target anonymization processing range from one or more output intermediate results in the one or more anonymization processing histories, and acquires the remaining processed data sets from the database or from a portion of the one or more anonymization processing histories other than the one or more output intermediate results. (x3) The query processing unit stores an anonymization processing history including all processed data sets satisfying the target anonymization processing condition among all the processed data sets acquired in (x2) or unprocessed data sets thereof as output intermediate results for the target anonymization processing range.

The "processed data set satisfying the anonymization processing condition" is a processed data set belonging to at least one processed data set group satisfying the anonymization processing condition. The "processed data set group" includes the same processed data sets, more specifically, for example, includes processed data sets in each of which all quasi-identifiers (one or more attribute values including at least one processed attribute value) are the same. For example, if the anonymization processing is k-anonymization, the number of same processed data sets is equal to or greater than the k value in the processed data set group that satisfies the anonymization processing condition. In addition, for example, if the anonymization processing is 1-diversity, the number of different sensitive values (confidential information values) in a plurality of processed data sets each having the same quasi-identifiers is equal to or greater than the 1 value in the processed data set group that satisfies the anonymization processing condition.

The anonymization processing history stored in (x3) may include a non-output intermediate result. The non-output intermediate result may be either a first non-output intermediate result constituted by all processed data sets, among all the processed data sets acquired in (x2), that do not satisfy the target anonymization processing condition or the unprocessed data sets thereof, or a second non-output intermediate result that is a list of pointers to tuples including the above unprocessed data sets. In (x2), the portion other than the one or more output intermediate results may be one or more non-output intermediate results of the one or more anonymization processing histories.

In (x3), when a history-related capacity is equal to or less than an upper limit thereof (and/or when the loss rate, which is a ratio of the number of processed data sets that do not satisfy the target anonymization processing condition to the number of processed data sets corresponding to the target anonymization processing range, exceeds an upper limit thereof), the query processing unit may store the first non-output intermediate result. On the other hand, in (x3), when the loss rate is equal to or less than the upper limit thereof (and/or when the history-related capacity exceeds the upper limit thereof), the query processing unit may store the second non-output intermediate result. The "history-related capacity" is a capacity related to the anonymization processing history group, and an example may be the above-mentioned non-output capacity or storage device usage capacity. Specifically, for example, the history-related capacity may be any one of the following capacities, or a capacity (for example, a total) based on two or more of the following capacities.

- A capacity of all processed data sets that do not satisfy the target anonymization processing condition.
- A capacity of the anonymization processing history group.
- A capacity of all the output intermediate results in the anonymization processing history group.
- A capacity of all non-output intermediate results in the anonymization processing history group.
- A capacity of all the first non-output intermediate results in the anonymization processing history group.

An example of the case where the determination result of (x1) is true includes a case in which there are one or more anonymization processing histories corresponding to a next case, that is, the anonymization processing range group (one or more anonymization processing ranges) with the target anonymization processing range as a subset thereof, and a processed attribute value can be obtained according to the target conversion rule based on at least one output intermediate result in the one or more anonymization processing histories.

The query processing unit may store the first non-output intermediate result for the anonymization processing associated with the clear indication of storage of the first non-output intermediate result. In this case, the storage of the first non-output intermediate result may be performed when the above-mentioned history-related capacity is equal to or lower than the upper limit (and/or when the loss rate exceeds the upper limit), and may be performed according to the clear indication regardless of the history-related capacity (and/or the loss rate). The clear indication of the storage of the first non-output intermediate result, for example, may be included in the received query, and the anonymization processing based on such a query may be an example of the anonymization processing associated with the clear indication of the storage of the first non-output intermediate result. A specific example of the anonymization processing includes the anonymization processing according to aQ1 illustrated in FIG. 8.

The query processing unit may return a query response including the output processed data set acquired in the anonymization processing when the execution result of the anonymization processing according to the target anonymization processing range satisfies a predetermined output condition in (x2). The predetermined output condition is a condition for permitting a query response to be returned. An example of the predetermined output condition may be that a loss rate according to the execution result falls within a predetermined loss rate range. The "loss ratio falls within a predetermined loss ratio range" may mean that the loss rate is equal to or greater than a lower limit value that is one end of the loss rate range and equal to or less than an upper limit value that is the other end of the loss ratio range.

The query processing unit may or may not execute (x3) when the predetermined output condition is not satisfied. Further, when the predetermined condition is not satisfied, the query processing unit may perform at least (x1) and (x2) among (x1) to (x3) with the anonymization processing range including another conversion rule based on the received query as the target anonymization processing range. The "another conversion rule" may be a conversion rule generated based on the received query when the predetermined output condition is not satisfied, or may be a conversion rule selected from two or more conversion rules having different abstraction levels (anonymization degree) which are generated based on the received query, when the predetermined output condition is not satisfied. Implementation of at least (x1) and (x2) for another conversion rule may be performed when the received query includes a clear indication of a plurality of kinds of conversion rules (for example, "CHOICE ( )").

For another conversion rule, at least one of the following may be performed.

- When the conversion rule is selected in descending order of abstraction level of the conversion rule, a previous conversion rule has a higher abstraction level than the another conversion rule, and a query response including the previous conversion rule does not satisfy the output condition, it is determined that the response of the query including the another conversion rule does not satisfy the output condition. In this case, a query including the another conversion rule is not to be executed. In addition, the remaining conversion rules each having a lower abstraction level than the another conversion rule may not be executed.
- When the conversion rule is selected in descending order of abstraction level of the conversion rule, a previous conversion rule has a higher abstraction level than the another conversion rule, and a response of the query including the previous conversion rule satisfies the output condition (for example, further, even if the response of the query that includes the previous conversion rule satisfies the output condition, the response does not necessarily return to a query issuer), it is determined that the response of the query including the another conversion rule may satisfy the output condition. In this case, a query including the another conversion rule is to be executed.

When the conversion rule is selected in ascending order of abstraction level of the conversion rule, a previous conversion rule has a lower abstraction level than the another conversion rule, and a response of the query including the previous conversion rule does not satisfy the output condition, it is determined that the response of the query including the another conversion rule does not satisfy the output condition. In this case, a query including the another conversion rule is not to be executed. In addition, the remaining conversion rules each having a higher abstraction level than the another conversion rule may not be executed.

When the conversion rule is selected in ascending order of abstraction level of the conversion rule, a previous conversion rule has a lower abstraction level than the another conversion rule, and a response of the query including the previous conversion rule satisfies the output condition (for example, further, even if the response of the query that includes the previous conversion rule satisfies the output condition, the response does not necessarily return to the query issuer), it is determined that the response of the query including the another conversion rule may satisfy the output condition. In this case, a query including the another conversion rule is to be executed.

The query processing unit may further include an anonymization result, which is information related to the execution of the anonymization processing and is information including information related to whether or not the anonymization processing range and the predetermined output condition are satisfied, in the anonymization processing history of the anonymization processing. The query processing unit may determine whether or not to execute anonymization processing for the anonymization processing range including the another conversion rule based on one or more anonymization results (hereinafter referred to as one or more previous anonymization results) including one or more anonymization processing histories corresponding to one or more anonymization processing executed for the received query, and the anonymization processing range including the another conversion rule. The "previous anonymization result" may be an anonymization result corresponding to an anonymization processing range with an anonymization processing range corresponding to the another conversion rule as a subset thereof. Further, the determination of "whether or not to execute anonymization processing for the anonymization processing range including the another conversion rule" may be performed based on, for example, according to the previous anonymization result, the anonymization condition, the output condition, and the success/failure (whether or not the output condition is satisfied), the anonymization condition and the output condition corresponding to the another conversion rule, the abstraction level of the conversion rule corresponding to the previous anonymization result, and the abstraction level of the another conversion rule.

What is claimed is:

1. A database management system that manages a database storing a relationship table including a plurality of tuples each including values for attributes, comprising:
   a processor coupled to a memory storing instructions that when executed configure the processor to:
   receive a first query including a first conversion rule;
   process the relationship table based on the first conversion rule, store a first processing result table which is a processing result, and calculate the number of tuples for each value appearing in a predetermined attribute in the first processing result table, and
   receive a second query including a second conversion rule, wherein
   when the second query including the second conversion rule is received, the processor is configured to process the relationship table based on the second conversion rule; and at that time,
      for tuples the number of which for each value appearing in the predetermined attribute satisfies a condition required for the anonymization processing, data is acquired from the first processing result table processed based on the first conversion rule, and
      for tuples the number of which for each value appearing in the predetermined attribute does not satisfy the condition required for the anonymization processing, data is acquired from the database or a result of processing the relationship table, the result being stored in other than the first processing result table, and the relationship table is processed based on the second conversion rule using the data, and wherein
   the first processing result table includes the tuples the number of which for each value appearing in the predetermined attribute satisfies the condition required for the anonymization processing among the results of processing the relationship table,
   the processor is configured to further store a second processing result table including the tuples the number of which for each value appearing in the predetermined attribute does not satisfy the condition required for the anonymization processing among the results of processing the relationship table, and
   when processing the relationship table based on the second conversion rule, the processor is configured to acquire data from the second processing result table and process the relationship table using the data.

2. The database management system according to claim 1, wherein
   when a loss rate exceeds a threshold, the loss rate being a ratio of the tuples the number of which for each value appearing in the predetermined attribute does not satisfy the condition required for the anonymization processing among tuples included in the results of processing the relationship table, or when a storage device usage capacity including a capacity of the first processing result table and a capacity of the second processing result table is equal to or less than a threshold, the processor is configured to further store the second processing result table.

3. The database management system according to claim 1, wherein
   the processor is configured to store storage information indicating storage positions in the database of the tuples the number of which for each value appearing in the predetermined attribute does not satisfy the condition required for the anonymization processing among the results of processing of the relationship table.

4. The database management system according to claim 3, wherein when a storage device usage capacity including a capacity of the first processing result table and a capacity of the second processing result table is equal to or greater than a threshold, or when a loss rate is equal to or less than a threshold, the loss rate being a ratio of the tuples the number of which for each value appearing in the predetermined attribute does not satisfy the condition required for the anonymization processing among the tuples included in the results of processing the relationship table, the processor is configured to store the storage information without storing the second processing result table.

5. The database management system according to claim 1, wherein when a search range indicated in the second conversion rule of the second query is included in a search range indicated in the first conversion rule of the first query, data is acquired from the first processing result table and/or the second processing result table, and the relationship table is processed based on the second conversion rule using the data.

6. The database management system according to claim 1, wherein an execution result is different between a query corresponding to a set anonymization processing condition and a query not corresponding to the anonymization processing condition among a plurality of queries that are received.

7. A database management system that manages a database storing a relationship table including a plurality of tuples each including values for attributes comprising:

a processor coupled to a memory storing instructions that when executed configure the processor to:

receive a first query including a first conversion rule;

process the relationship table based on the first conversion rule, store a first processing result table which is a processing result, and calculate the number of tuples for each value appearing in a predetermined attribute in the first processing result table, and receive a second query including a second conversion rule, wherein when the second query including the second conversion rule is received, the processor is configured to process the relationship table based on the second conversion rule; and at that time, for tuples the number of which for each value appearing in the predetermined attribute satisfies a condition required for the anonymization processing, data is acquired from the first processing result table processed based on the first conversion rule, and for tuples the number of which for each value appearing in the predetermined attribute does not satisfy the condition required for the anonymization processing, data is acquired from the database or a result of processing the relationship table, the result being stored in other than the first processing result table, and the relationship table is processed based on the second conversion rule using the data, and wherein when a loss rate is equal to or greater than a lower limit value and equal to or less than an upper limit value, the loss rate being a ratio of the tuples the number of which for each value appearing in the predetermined attribute does not satisfy the condition required for the anonymization processing among tuples included in the results of processing the relationship table, the processor is configured to transmit an execution result for the first query.

8. A database management system that manages a database storing a relationship table including a plurality of tuples each including values for attributes, comprising:

a processor coupled to a memory storing instructions that when executed configure the processor to:

receive a query including a conversion rule; and process the relationship table based on a third conversion rule generated based on the conversion rule included in the received query, store a third processing result table which is a processing result, and calculate the number of tuples for each value appearing in a predetermined attribute in the third processing result table, wherein when the result of the calculation does not satisfy a predetermined condition, the processor is configured to process the relationship table based on a fourth conversion rule; and at that time, for tuples the number of which for each value appearing in a predetermined attribute satisfies a condition required for the anonymization processing, data is acquired from the third processing result table processed based on the third conversion rule, and for tuples the number of which for each value appearing in the predetermined attribute does not satisfy the condition required for the anonymization processing, data is acquired from the database or a result of processing the relationship table, the result being stored in other than the third processing result table, and the relationship table is processed based on the fourth conversion rule using the data, wherein when a loss rate is equal to or greater than a lower limit value and equal to or less than an upper limit value, the loss rate being a ratio of the tuples the number of which for each value appearing in the predetermined attribute does not satisfy the condition required for the anonymization processing among tuples included in the results of processing the relationship table, the processor is configured to transmit an execution result for the received query, and when the loss rate is less than the lower limit value or exceeds the upper limit value, the processor is configured to generate the fourth conversion rule without transmitting the execution result for the received query, and process the relationship table based on the fourth conversion rule.

9. The database management system according to claim 8, wherein the received query includes conversion rule related information corresponding to a conversion rule different from the third conversion rule, and the processor is configured to generate the fourth conversion rule based on the conversion rule related information.

10. The database management system according to claim 8, wherein the processor is configured to generate a conversion rule, that is at least one of a plurality of conversion rules indicated in conversion rule management information indicating the plurality of conversion rules, as the fourth conversion rule.

11. A database management system that manages a database storing a relationship table including a plurality of tuples each including values for attributes, comprising:

a processor coupled to a memory storing instructions that when executed configure the processor to:

receive a query including a conversion rule; and
process the relationship table based on a third conversion rule generated based on the conversion rule included in the received query, store a third processing result table which is a processing result, and calculate the number of tuples for each value appearing in a predetermined attribute in the third processing result table, wherein when the result of the calculation does not satisfy a predetermined condition, the processor is configured to process the relationship table based on a fourth conversion rule; and at that time,
for tuples the number of which for each value appearing in a predetermined attribute satisfies a condition required for the anonymization processing, data is acquired from the third processing result table processed based on the third conversion rule, and
for tuples the number of which for each value appearing in the predetermined attribute does not satisfy the condition required for the anonymization processing, data is acquired from the database or a result of processing the relationship table, the result being stored in other than the third processing result table, and the relationship table is processed based on the fourth conversion rule using the data, wherein
for at least one query received before receiving a third query, the processor is configured to determine whether or not to process the relationship table based on the fourth conversion rule, based on a predetermined conversion rule associated with the at least one query, a loss rate that is a ratio of tuples the number of which for each value appearing in the predetermined attribute does not satisfy a condition required for the anonymization processing among tuples included in results of processing the relationship table based on the predetermined conversion rule, the fourth conversion rule, the predetermined conversion rule included in the at least one query, and the loss rate.

12. An anonymization processing method of a database that stores a relationship table including a plurality of tuples each including values for attributes, the method comprising:
receiving a first query including a first conversion rule;
processing the relationship table based on the first conversion rule and storing a first processing result table which is a processing result;
calculating the number of tuples for each value appearing in a predetermined attribute in the first processing result table;
receiving a second query including a second conversion rule; and
processing the relationship table based on the second conversion rule, and at that time,
for tuples the number of which for each value appearing in the predetermined attribute satisfies a condition required for the anonymization processing, data is acquired from the first processing result table processed based on the first conversion rule, and
for tuples the number of which for each value appearing in the predetermined attribute does not satisfy the condition required for the anonymization processing, data is acquired from the database or a result of processing the relationship table, the result being stored in other than the first processing result table, and the relationship table is processed based on the second conversion rule using the data, and wherein
the storing of the first processing result table includes storing the tuples the number of which for each value appearing in the predetermined attribute satisfies the condition required for the anonymization processing among the results of processing the relationship table,
storing a second processing result table including the tuples the number of which for each value appearing in the predetermined attribute does not satisfy the condition required for the anonymization processing among the results of processing the relationship table, and
when the processing of the relationship table is based on the second conversion rule, acquiring data from the second processing result table and processing the relationship table using the data.

13. An anonymization processing method for a database management system that manages a database storing a relationship table including a plurality of tuples each including values for attributes, the method comprising:
receiving a query including a conversion rule;
processing the relationship table based on a third conversion rule generated based on the conversion rule included in the received query and storing a third processing result table which is a processing result;
calculating the number of tuples for each value appearing in a predetermined attribute in the third processing result table; and
processing the relationship table based on a fourth conversion rule when the result of calculation does not satisfy a predetermined condition, and at that time,
for tuples the number of which for each value appearing in the predetermined attribute satisfies a condition required for the anonymization processing, data is acquired from the third processing result table processed based on the third conversion rule, and
for tuples the number of which for each value appearing in the predetermined attribute does not satisfy the condition required for the anonymization processing, data is acquired from the database or a result of processing the relationship table, the result being stored in other than the third processing result table, and the relationship table is processed based on the fourth conversion rule using the data, and wherein
when a loss rate is equal to or greater than a lower limit value and equal to or less than an upper limit value, the loss rate being a ratio of the tuples the number of which for each value appearing in the predetermined attribute does not satisfy the condition required for the anonymization processing among tuples included in the results of processing the relationship table, an execution result for the third query is transmitted, and
when the loss rate is less than the lower limit value or exceeds the upper limit value, the fourth conversion rule is generated without transmitting the execution result for the received query, and process the relationship table based on the fourth conversion rule.

* * * * *